(12) United States Patent
Mitra

(10) Patent No.: US 11,003,571 B2
(45) Date of Patent: May 11, 2021

(54) CUSTOMIZABLE ENTERPRISE AUTOMATION TEST FRAMEWORK

(71) Applicant: Oracle International Corporation, Redwood Shores, CA (US)

(72) Inventor: Saurabh Mitra, Hyderabad (IN)

(73) Assignee: Oracle International Corporation, Redwood Shores, CA (US)

( * ) Notice: Subject to any disclaimer, the term of this patent is extended or adjusted under 35 U.S.C. 154(b) by 222 days.

(21) Appl. No.: 16/376,484

(22) Filed: Apr. 5, 2019

(65) Prior Publication Data

US 2020/0319995 A1 Oct. 8, 2020

(51) Int. Cl.
*G06F 9/44* (2018.01)
*G06F 11/36* (2006.01)

(52) U.S. Cl.
CPC ...... *G06F 11/3664* (2013.01); *G06F 11/3684* (2013.01); *G06F 11/3692* (2013.01)

(58) Field of Classification Search
CPC ...................................................... G06F 9/44
See application file for complete search history.

(56) References Cited

U.S. PATENT DOCUMENTS

| | | | |
|---|---|---|---|
| 6,697,967 | B1 | 2/2004 | Robertson |
| 7,272,822 | B1 | 9/2007 | Riggins et al. |
| 7,958,495 | B2 | 6/2011 | Kelso |
| 8,924,934 | B2 | 12/2014 | Sullivan et al. |
| 9,658,944 | B2 | 5/2017 | Ganda et al. |
| 2002/0158905 | A1* | 10/2002 | Bazzoni ............. G06F 16/95 715/760 |
| 2004/0167749 | A1 | 8/2004 | Friedman et al. |
| 2005/0228644 | A1 | 10/2005 | Wang |
| 2010/0100872 | A1 | 4/2010 | Mitra |

(Continued)

FOREIGN PATENT DOCUMENTS

| | | |
|---|---|---|
| CN | 101996131 A | 3/2011 |
| CN | 107526679 A | 12/2017 |

OTHER PUBLICATIONS

Ames et al., "Critical Paths for GUI Regression Testing", University of California, 2004, p. 1-11.

(Continued)

*Primary Examiner* — Jae U Jeon
(74) *Attorney, Agent, or Firm* — Potomac Law Group, PLLC

(57) ABSTRACT

Embodiments provide systems and methods for implementing a customizable enterprise automation test framework. A workflow definition, page structure definition, and function definition for an automated test of an enterprise website can be received. A hybrid script parser can parse the workflow definition, page structure definition, and function definition to generate a hybrid script for the automated test. An automation tool parser can parse the hybrid script to generate an output for an automation tool. Based on the output from the automation tool parser, a runtime script can be generated that is executed by the automation tool to generate results for the automated test, where the automation tool implements the steps of the one or more workflows on the plurality of web pages of the enterprise web site to generate the results for the automated test.

20 Claims, 28 Drawing Sheets

(56) References Cited

U.S. PATENT DOCUMENTS

| | | | | |
|---|---|---|---|---|
| 2012/0216219 A1* | 8/2012 | Sharma | ................. | G16H 40/20 |
| | | | | 719/331 |
| 2014/0298296 A1* | 10/2014 | Tambey | ............. | G06F 11/3672 |
| | | | | 717/124 |
| 2014/0344781 A1* | 11/2014 | Andres | ............... | G06F 9/45508 |
| | | | | 717/115 |
| 2018/0089066 A1 | 3/2018 | Barnett et al. | | |

OTHER PUBLICATIONS

Author Unknown, "Cross-Browser Testing", retrieved from https://smartbear.com/product/testcomplete/cross-browser-testing-tool/ on Nov. 15, 2018, 3 pages.

Author Unknown, "Web Application Testing", retrieved from https://smartbear.com/product/testcomplete/web-testing on Nov. 15, 2018, 4 pages.

Mu et al., "Design and Implementation of GUI Automated Testing Framework Based on XML", World Congress on Software Engineering, 2009, p. 194-199.

Simpson et al., "Automated Software Testing Implementation Guide", Stat T&E Center of Excellence, Apr. 2017, 3 pages.

Heinecke et al., "Business Process-Based Testing of Web Application", Lecture Notes in Business Information Processing, Jan. 24, 2012.

* cited by examiner

```
<functionality display_index="1" name="search_one_way_flight" desc="Search One Way Flight for One Passenger Without Selecting any addon">
<step order="1" step_name="trip_type_select" step_desc="Click on One Way" action="click" default_data="NULL" action_type="mandatory" action_method="default:click" form_display="true" action_on_elem="landing_page.default.one_way"/>
<step order="2" step_name="destination_from" step_desc="Enter From" action="click_and_type" default_data="Hyderabad" action_type="mandatory" action_method="default:click_and_type" form_display="true" action_on_elem="landing_page.default.from"/>
<step order="3" step_name="destination_to" step_desc="Enter To" action="click_and_type" default_data="Kolkata" action_type="mandatory" action_method="default:click_and_type" form_display="true" action_on_elem="landing_page.default.to"/>
<step order="4" step_name="depart_date" step_desc="Select Depart Date : DD/MM" action="custom_calendar_date_select" default_data="" action_type="mandatory" action_method="fl.select_depart_date()" form_display="true" action_on_elem="landing_page.default.depart"/>
<step order="5" step_name="add_passenger" step_desc="Enter No of Passenger : A[1]C[0]I[0]" action="custom_passenger_select" default_data="" action_type="mandatory" action_method="fl.enter_passenger_count()" form_display="true" action_on_elem="landing_page.default.passengers"/>
<step order="6" step_name="currency" step_desc="Select Currency : INR/AED/USD" action="select" default_data="NULL" action_type="mandatory" action_method="default:select" form_display="true" action_on_elem="landing_page.default.currency"/>
<step order="7" step_name="search" step_desc="Click on Search" action="click" default_data="NULL" action_type="mandatory" action_method="default:click" form_display="true" action_on_elem="landing_page.default.search"/>
</functionality>
```

```xml
<framework>
  <automation_tool>selenium</automation_tool>
  <suite_name>spj_sanity</suite_name>
  <suite_desc>Dummy Air Flight Booking</suite_desc>
  <suite_to_exec>D:\Research\dummyair\suite\dummyair_suite.xml</suite_to_exec>
  <script_to_exec>D:\Research\dummyair\dummyair_demoShybrid.txt</script_to_exec>
  <browser_for_exec>firefox</browser_for_exec>
  <exec_by>Saurabh</exec_by>
  <exec_for_impl>dummyair</exec_for_impl>
  <impl_props_file>
    D:\Research\dummyair\configuration_files\dummyair_implementation_properties.xml
  </impl_props_file>
  D:\Research\dummyair\results
  <geo_popup_img_file_rel_name>browser_geo_popup_share_location_button</geo_popup_img_file_rel_name>
  <geo_popup_share_loc_not_now_img_file_rel_name>browser_geo_popup_share_location_not_now_button</geo_popup_share_loc_not_now_img_filename>
  <chrome_driver>D:/Scripts/chromedriver_win32/chromedriver.exe</chrome_driver>
  <ie_driver>D:/Scripts/chromedriver_win32/IEDriverServer.exe</ie_driver>
  <browser_maximized>true</browser_maximized>
  <element_timeout>30</element_timeout>
</framework>
```

Fig. 9A

```
<implementations>
 <implementation impl_name="dummyair">
  <full_name>dummyair</full_name>
  <url>https://www.dummyair.com</url>
  <hybrid_script_folder>D:\Research\dummyair\</hybrid_script_folder>
  <ocr_folder>D:\Research\dummyair\ocr\</ocr_folder>
  <function_library_file_path>
   /home/saumitra/htdocs/webapp/eats/implementation/dummyair/implementation_definition/func_library_definition_dummyair.xml
  </function_library_file_path>
  <functional_workflow_file_path>
   /home/saumitra/htdocs/webapp/eats/implementation/dummyair/implementation_definition/functional_workflow_dummyair.xml
  </functional_workflow_file_path>
  <page_structure_xml_file_path>
   /home/saumitra/htdocs/webapp/eats/implementation/dummyair/implementation_definition/page_structure_dummyair.xml
  </page_structure_xml_file_path>
  <impl_specific_function_repository/>
 </implementation>
 <implementation impl_name="mockair">
  <full_name>mockair</full_name>
  <url>https://www.mockair.in</url>
  <hybrid_script_folder>D:\Research\mockair\</hybrid_script_folder>
  <ocr_folder>D:\Research\mockair\ocr\</ocr_folder>
  <function_library_file_path>
   /home/saumitra/htdocs/webapp/eats/implementation/mockair/implementation_definition/func_library_definition_mockair.xml
  </function_library_file_path>
  <functional_workflow_file_path>
   /home/saumitra/htdocs/webapp/eats/implementation/mockair/implementation_definition/functional_workflow_mockair.xml
  </functional_workflow_file_path>
  <page_structure_xml_file_path>
   /home/saumitra/htdocs/webapp/eats/implementation/mockair/implementation_definition/page_structure_mockair.xml
  </page_structure_xml_file_path>
  <impl_specific_function_repository/>
 </implementation>
</implementations>
```

```
<suite>
<script id="BAT_001" name="spj_ow_booking_demo5hybrid" desc="One way flight booking" impl="dummyair">D:\Research\dummyair\dummyair_demo5hybrid.txt</script>
</suite>
```
906

```
<suite name="spj_sanity" impl="dummyair" desc="Dummyair Flight Booking" run_id="2318_Sep_15_2018">
<test id="BAT_001" name="spj_ow_booking_demo5hybrid" impl="dummyair" desc="One way Flight booking" exec_status="PASS" test_results_xml="2318_Sep_15_2018_spj_ow_booking_demo5hybrid_test_results.xml"> </test>
</suite>
```
908

Customized Enterprise Application Test Automation System                    Home Logout

TEST CREATION
Create Hybrid Script

EXECUTION REPORT
Upload Report
View Report

View Test Results:

| Step Index | Step Desc. | Step Exec. Comments | Step Status |
|---|---|---|---|
| 1 | Clicking on one way button | Clicked on element | PASS |
| 2 | Entering From Location | Clicked on element and typed value MUMBAI | PASS |
| 3 | Entering To Location | Clicked on element and typed value DELHI | PASS |
| 4 | Selecting departure date | Selected Date 29-September-2018 | PASS |
| 5 | Selecting passenger count | Skipping step as EXEC_LINE Flag in hybrid script is set to false | SKIP |
| 6 | Selecting currency | Skipping step as EXEC_LINE Flag in hybrid script is set to false | SKIP |
| 7 | Clicking on Flights button | Clicked on element | PASS |
| 8 | Searching preferred flight based on user specified timings | | FAIL |
| 9 | Clicking on Continue button | | FAIL |

TEST CREATION
Create Hybrid Script

EXECUTION REPORT
Upload Report

View Report

View Test Results :

| Step Index | Step Desc | Step Exec Comments | Step Status |
|---|---|---|---|
| 2 | Default city and type | Clicked on element and typed value MUMBAI | PASS |
| 3 | Default city and type | Clicked on element and typed value DELHI | PASS |
| 4 | Incoming passenger count | Successfully selected passenger count as 2 | PASS |
| 5 | Selecting depart date | Skipping step as EXEC_LINE Flag in hybrid script is set to false | SKIP |
| 6 | Select currency | Skipping step as EXEC_LINE Flag in hybrid script is set to false | SKIP |
| 9 | Clicking on Search flight | Clicked on element | PASS |

| Event Index | Event Desc | Event Status |
|---|---|---|
| 1 | Target element is displayed.Element is clicked and data DELHI is typed | PASS |

CUSTOMIZABLE ENTERPRISE AUTOMATION TEST FRAMEWORK

FIELD

The embodiments of the present disclosure generally relate to a customizable enterprise web application automation test framework.

BACKGROUND

An enterprise entity's web presence has become increasingly important. For example, e-commerce has grown exponentially over the years, and other enterprise activities are increasingly moving online. In addition, as web technology progresses, web applications and websites have gained complex functionality. These trends have changed the expectations of enterprise system clients, customers, and/or users. For example, online transactions, integration, and/or workflows that are anything but seamless can cause complaints over usability issues. As a result, an enterprise web presence may often be changed or updated with new functionality or content, yet usability is expected to be maintained or enhanced. Accordingly, a framework that can automate testing of a web presence that is both customizable and achieves effort efficiencies can greatly improve enterprise websites or web applications.

SUMMARY

The embodiments of the present disclosure are generally directed to systems and methods for implementing a customizable enterprise automation test framework that substantially improve upon the related art. A workflow definition, page structure definition, and function definition for an automated test of an enterprise website can be received, wherein the workflow definition defines one or more workflows for one or more test cases that comprise a series of steps, the page structure definition defines web elements that comprise a plurality of web pages of the enterprise website, and the function definition defines enterprise website specific functions referenced by steps of the one or more workflows. A hybrid script parser can parse the workflow definition, page structure definition, and function definition to generate a hybrid script for the automated test. An automation tool parser can parse the hybrid script to generate an output for an automation tool. Based on the output from the automation tool parser, a runtime script can be generated that is executed by the automation tool to generate results for the automated test, wherein the automation tool implements the steps of the one or more workflows on the plurality of web pages of the enterprise web site to generate the results for the automated test.

Features and advantages of the embodiments are set forth in the description which follows, or will be apparent from the description, or may be learned by practice of the disclosure.

BRIEF DESCRIPTION OF THE DRAWINGS

Further embodiments, details, advantages, and modifications will become apparent from the following detailed description of the preferred embodiments, which is to be taken in conjunction with the accompanying drawings.

FIGS. 4A, 4B, 5A, and 5B illustrate versions of an enterprise web application according to an example embodiment.

FIG. 6A illustrates an example workflow definition according to an example embodiment.

FIG. 6B illustrates an example workflow for searching a flight according to an example embodiment.

FIG. 6C illustrates an example page structure definition according to an example embodiment.

FIG. 6D illustrates an example function definition according to an example embodiment.

FIG. 9A illustrates an example implementation frame configuration according to an example embodiment.

FIG. 9B illustrates example implementation frame properties according to an example embodiment.

FIG. 9C illustrates an example suite file and suite results according to an example embodiment.

FIG. 9D illustrates example customized automated test results according to an example embodiment.

FIG. 10B illustrates a detailed test level results web page according to an example embodiment.

FIG. 10C illustrates example test results with a fail status according to an example embodiment.

FIGS. 11A, 11B, 11C, and 11D illustrate user interfaces for configurating hybrid script generation for another customized automated test according to an example embodiment.

DETAILED DESCRIPTION

Figure 1:
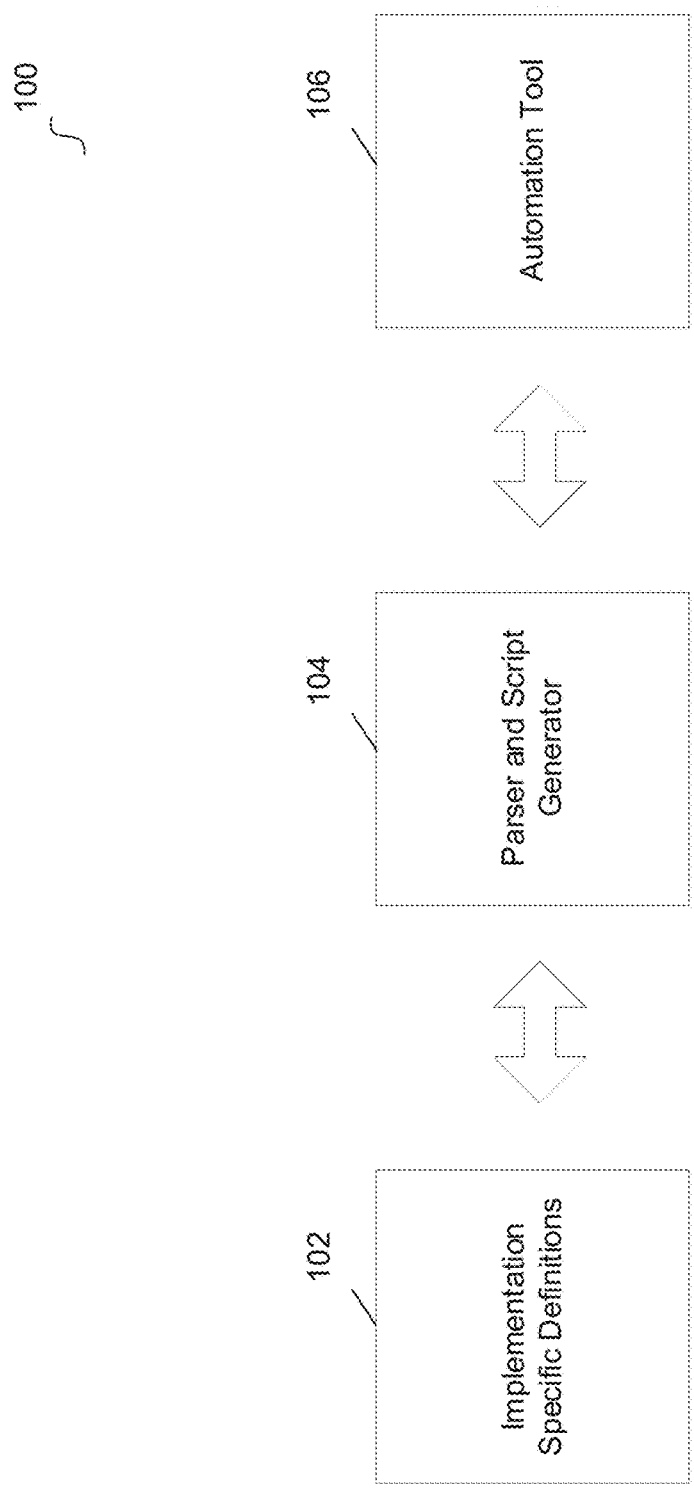
FIG. 1 illustrates a system for implementing a customizable enterprise automation test framework according to an example embodiment.

Embodiments implement a customizable enterprise automation test framework. For example, an enterprise may have a web presence, such as a web application or website. It may be beneficial to test the web presence at times, such as to ensure the various portions of the web application or website function perform as expected. For example, the web presence can be tested when changes are implemented (e.g., updates, patches, and the like) or at any other suitable time.

Such testing can be time consuming and costly when done manually. Accordingly, automation tools can be used to enhance the efficiency of the testing. However, such automation tools also require configuration, which can itself be excessively time consuming. For example, different versions of a web presence may call for customized tests or tests can be customized into different versions for a variety of reasons. Configuring an automation tool to run such customized tests can result in duplication of manual effort.

Embodiments implement a customizable enterprise automation test framework that improves the efficiency and flexibility of performing automated testing on a web presence (e.g., web application or website). For example, definitions for an enterprise website can be used to generate a hybrid script, the hybrid script can be parsed to generate a run time script, and the run time script can be used by an automation tool to implement automated tests on the enterprise website.

In some embodiments, the definitions can include workflow definitions, page structure definitions, and functionality definitions. For example, workflow definitions can define workflows that include a series of steps to be performed for a test. Page structure definitions can define the web elements for web pages of an enterprise website. Function definitions can define enterprise website specific functions that are used to perform the enterprise website test (e.g., functions that are called by the steps of the workflows). In some embodiments, these definitions are stored in a markup language document (e.g., an extensible markup language ("XML") document).

Embodiments can parse the definitions (e.g., using a hybrid script parser) to generate a hybrid script for the enterprise website test. The hybrid script can represent a customized version of an automated test (e.g., customized based on the received definitions). In some embodiments, the hybrid script can then be parsed by an automation tool parser. For example, the hybrid script can be configured to work with any number of automation tools (e.g., web presence test automation tools available to one of ordinary skill in the art). A given automation tool parser can be configured to generate an output that is usable by a specific automation tool. As such, the hybrid script can be combined with different automation tool parsers, and these various combinations can be used to implement the customized test with a variety of different automation tools.

In some embodiments, the output of the automation tool parser can be used to generate a run time script (e.g., to be used by the automation tool associated with the automation tool parser to implement the customized test). For example, the run time script can be received by an automation tool (e.g., cloud based automation tool) that then implements the customized test represented in the run time script on the enterprise website. This implementation generates test results, which can be received and/or displayed in a user interface. For example, the test results can include a status (e.g., Pass, Fail, Skipped) for the workflows defined in the workflow definition and/or for the individual steps of one of these workflows.

Embodiments of the disclosure can be beneficial in a number of circumstances. For example, in the case of an enterprise packaged web application, the product is often delivered to an enterprise customer with a number of customizations (e.g., implemented per customer request). In addition, an enterprise web presence can have many variations, and thus one enterprise website or web application may be similar to another, yet include differences as a result of customization.

For example, customizations can include one or more of the following: (1) Theme, color, font, stylesheets to reflect branding; (2) The navigation to access a functionality might vary, and as a result the navigation may involve traversing more or different web pages/screens in order to access the functionality; (3) The elements visible on a web page/screen might change in number and/or order (e.g., due to geographical restrictions, for some implementations some fields might be mandatory and for some other implementation those fields might not show up in the application); (4) The element type might change from one implementation to another (e.g., in one variation an element type might correspond to a freely editable field, while in another it might be a single select combo list, a radio button, or some other element); (5) In general, although visually two variations may have a similar number of fields/elements, the functionality can vary slightly between the two due to customization. A number of other circumstances can similarly benefit from a framework that efficiently implements customizable automated web tests, as described in various embodiments.

Embodiments provide benefits in view of conventional test automation frameworks. For example, often graphical user interface ("GUI") based web automation scripts have the below functionality:

Browser based navigation to desired web page/section;
Identifying the elements on which the actions need to be performed (e.g., actions can be the operations that we intend the script to perform on the web elements); and
Asserting checks in order to ensure that the script does what is intended to.

For many automation scripts, the above three parameters are often considered, yet the script can fail when one or more of the parameters change. For example, in a conventional implementation, the automation script (code) is often written for traversing web pages/frames, performing actions on the elements in the web page, asserting, and finally reporting. While this can work for vanilla based implementation (e.g., without user interface or functional customization), for variations where the user interface and/or the functionality changes from one implementation to another, these conventional scripts often fail as they are not scalable.

Another challenge is that these automation scripts are often strongly coupled to an underlying automation tool and, in some implementations, it is not possible to reuse the scripts when different automation tools are used (e.g., by different customers or between the product development organization, the implementation organization, and the customers). However, in many cases customer automation tools are different and there is no standardized automation tool that is used across customers. With such a diversity of tools, it would be unduly burdensome to certify a customized implementation of an enterprise packaged web application or website using each and every automation tool (e.g., used by all the customers), or at the least it would require unnecessary effort.

Embodiments implement a framework topology that is not tightly integrated with the underlying automation tool. For example, the underlying automation tool would be used for execution, but it can be swapped by replacing the loosely coupled automation tool specific framework parser with one that is loosely coupled with a different automation tool. In cases where different customers use different commercial or open-source automation tools, the conventional automation scripts become unusable.

Embodiments realize a customizable framework design topology that mitigates the existing problems through one or more of the below design principles.

The framework can be implemented with differing underlying automation tools (either commercial or open-source), for example, based on the disclosed hybrid script concept and runtime script combination.

The generated hybrid script does not include navigation/assertion/action information that is hard coded within the script. For example, these can be generated (e.g., based on external definitions) and can be modified, such as just prior to execution.

The logical functional flows can be published in a data format (e.g., the workflow definition). For example, the logical workflow can be defined in an XML format, and the ordering of the functional steps can be easily modified in any text editor, which can then result in customized versions of the scripts.

The elements (e.g., web elements) on which action/navigation/assertions can be performed and can be published in another data structure (e.g., page structure definition). These elements can be categorized into pages and sections.

A web interface component of the framework can read these files (e.g., XML files) and provide users the option to select customized steps for the script specific to the implementation. In addition, embodiments of the web interface allow a user to enter test ware data (e.g., input data) to generate a customized implementation.

Actions/assertions/navigations can be published as hybrid functions. For example, rather than using traditional code, references to the elements and data on which the function operate can be defined (e.g., in a markup language document). These functions can be defined in a file (e.g., function definition). In some embodiments, the runtime functions can be automation tool specific and can be generated based on these hybrid functions.

Variations of implementations of the enterprise packaged web application or website can have their own copy of data files to customize tests (e.g., the workflow definitions, page structure definitions, and function definitions).

The hybrid script generator can read these files as well as the steps and test data input from the web interface to generate the hybrid scripts.

The hybrid scripts can be in a text format that enables easy and fast modification of these scripts before execution for data modification, step order change, enabling/disabling step execution, and the like.

A reporting engine for the framework can generate suite and test level results files (e.g., XML file). In some embodiments, a web dashboard can convert the XML (e.g., to HTML) and display it in a web report interface.

Based on one or more of these features, embodiments of the customizable framework provide the below improvements. In view of the hybrid script and automation tool specific parser, embodiments can function with multiple underlying automation tools (e.g., commercial or open-source). For example, some implementations utilize two script layers, hybrid and run time, for easy coupling with the underlying automation tool. In addition, the hybrid script generated can be shared with a customer without the need to share the code that generated it.

In some embodiments, the hybrid script layer is text based and a variety of users can modify it (e.g., users with no coding experience). In a number of cases, the hybrid scripts can be generated in advance of creating the run time functions. In some embodiments, web page elements, functional workflow, and functions can be defined as metadata format (e.g., in a data file, such as a markup language file) resulting in easier management and robust scripts. For instance, in the case of element properties or document object model ("DOM") changes, there is no need to make code changes (e.g., modifying the definition files, or XML files in some embodiments, would suffice). To test different scenarios with some mandatory and optional field enabling/disabling, code modification is not necessary, modification of the generated hybrid script would be sufficient.

In some embodiments, in case the visual ordering of the web elements in the customized web pages change, changing the ordering of functional workflow (e.g., workflow XML file) would be sufficient. In some embodiments, the framework can be tweaked to automatically perform prerequisite activities depending on what action is selected. This can be achieved through the parent_page attribute and dependent_action attributes (e.g., in the function library XML).

In some embodiments, although functionality to be performed is customized, the function names for different customized tests (e.g., tests customized to different versions of an enterprise website) can remain the same in the hybrid scripts. In this case, at the run time script level the customizations can be implemented. In such an implementation, the hybrid script maintains readability and its management is simplified.

Reference will now be made in detail to the embodiments of the present disclosure, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, and circuits have not been described in detail so as not to unnecessarily obscure aspects of the embodiments. Wherever possible, like reference numbers will be used for like elements.

FIG. 1 illustrates a system for implementing a customizable enterprise automation test framework according to an example embodiment. System 100 includes implementation specific definitions 102, parser and script generator 104, and automation tool 106. In some embodiments, implementation specific definitions 102 can provide definitions for a customized test to be implemented by automation tool 106, such as definitions for workflows that include steps for the test, definitions for a page structure for web pages (e.g., web pages of an enterprise website or web application) on which the customized test is to be run, and definitions for functions that are called by the steps of the workflows.

In some embodiments, parser and script generator 104 can parse implementation specific definitions 102 to generate a hybrid script. The hybrid script can then be used to generate a run time script that automation tool 106 uses to implement the customized test. In various embodiments, a given test can be customized based on implementation specific definitions 102. For example, a given set of definitions can be used to generate a hybrid script that configures the performance of the customized test. When this set of definitions changes (e.g., is edited by a user), the hybrid script that is generated can also change, and thus a different customized test is implemented by automation tool 106. In some embodiments, a user interface can also be used to customize the implementation of a test based on received edits to the workflows/steps defined in implementation specific definitions 102 and/or edits to the generated hybrid script.

Figure 2:
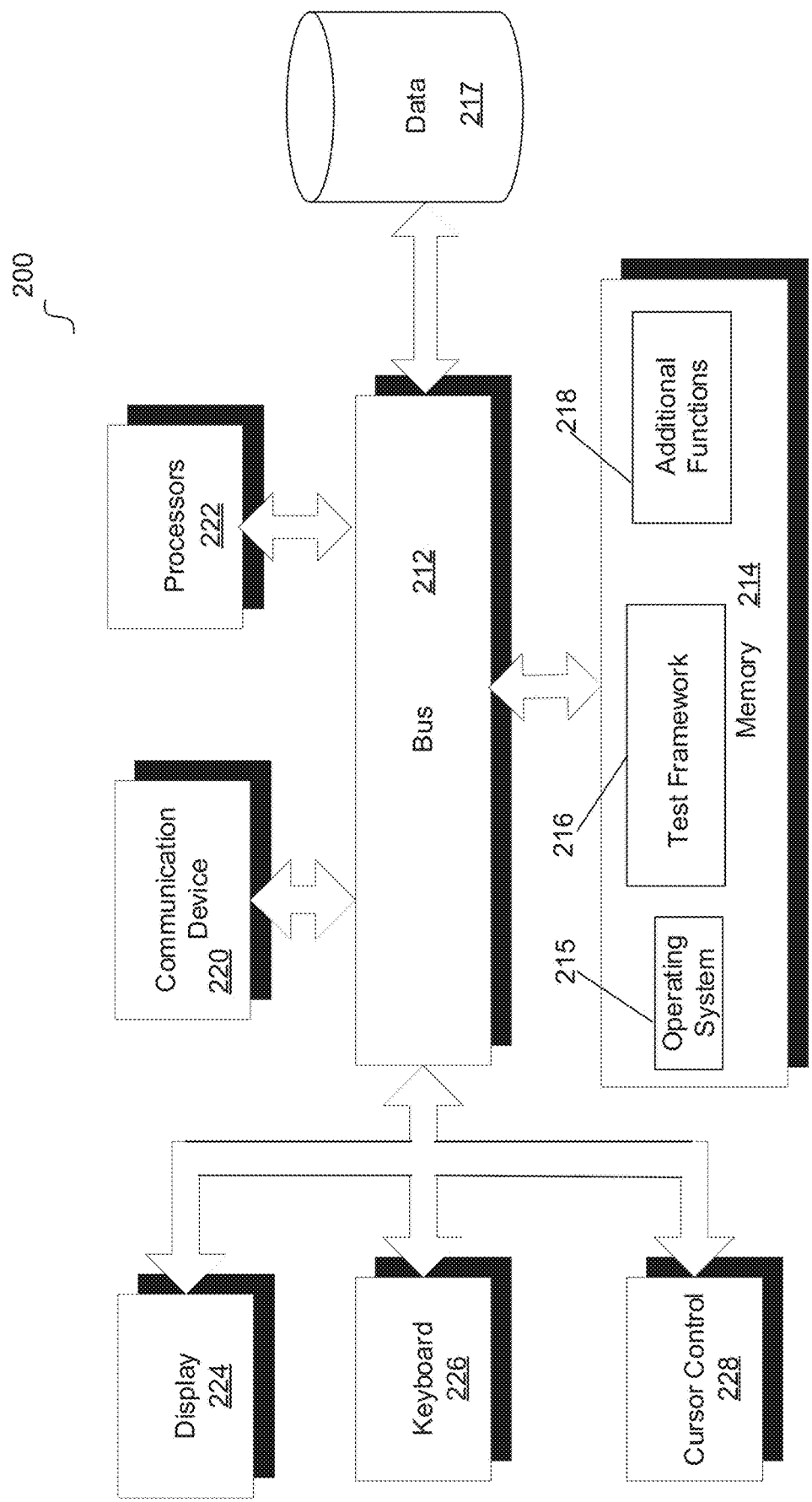
FIG. 2 illustrates a block diagram of a computing device operatively coupled to a system according to an example embodiment.

FIG. 2 is a block diagram of a computer server/system 200 in accordance with embodiments. All or portions of system 200 may be used to implement any of the elements shown in FIG. 1. As shown in FIG. 2, system 200 may include a bus device 212 and/or other communication mechanism(s) configured to communicate information between the various components of system 200, such as processor 222 and memory 214. In addition, communication device 220 may enable connectivity between processor 222 and other devices by encoding data to be sent from processor 222 to another device over a network (not shown) and decoding data received from another system over the network for processor 222.

For example, communication device 220 may include a network interface card that is configured to provide wireless network communications. A variety of wireless communication techniques may be used including infrared, radio, Bluetooth®, Wi-Fi, and/or cellular communications. Alternatively, communication device 220 may be configured to provide wired network connection(s), such as an Ethernet connection.

Processor 222 may include one or more general or specific purpose processors to perform computation and control functions of system 200. Processor 222 may include a single integrated circuit, such as a micro-processing device, or may include multiple integrated circuit devices and/or circuit boards working in cooperation to accomplish the functions of processor 222. In addition, processor 222 may execute computer programs, such as operating system 215, test framework 216, and other applications 218, stored within memory 214.

System 200 may include memory 214 for storing information and instructions for execution by processor 222. Memory 214 may contain various components for retrieving, presenting, modifying, and storing data. For example, memory 214 may store software modules that provide functionality when executed by processor 222. The modules may include an operating system 215 that provides operating system functionality for system 200. The modules can include an operating system 215, test framework 216 configured to implement customized automated tests and other functionality disclosed herein, as well as other applications modules 218. Operating system 215 provides operating system functionality for system 200. In some instances, test framework 216 may be implemented as an in-memory configuration. In some implementations, when system 200 executes the functionality of test framework 216, it implements a non-conventional specialized computer system that performs the functionality disclosed herein.

Non-transitory memory 214 may include a variety of computer-readable medium that may be accessed by processor 222. For example, memory 214 may include any combination of random access memory ("RAM"), dynamic RAM ("DRAM"), static RAM ("SRAM"), read only memory ("ROM"), flash memory, cache memory, and/or any other type of non-transitory computer-readable medium. Processor 222 is further coupled via bus 212 to a display 224, such as a Liquid Crystal Display ("LCD"). A keyboard 226 and a cursor control device 228, such as a computer mouse, are further coupled to communication device 212 to enable a user to interface with system 200.

In some embodiments, system 200 can be part of a larger system. Therefore, system 200 can include one or more additional functional modules 218 to include the additional functionality. Other applications modules 218 may include various modules of Oracle® Cloud Infrastructure, Oracle® Cloud Platform, Oracle® Cloud Applications, for example. Test framework 216, other applications module 218, and any other suitable component of system 200 can include various Java modules and/or modules of MySQL, and other suitable frameworks/services.

A database 217 is coupled to bus 212 to provide centralized storage for modules 216 and 218 and to store, for example, data for test framework 216 or other data sources. Database 217 can store data in an integrated collection of logically-related records or files. Database 217 can be an operational database, an analytical database, a data warehouse, a distributed database, an end-user database, an external database, a navigational database, an in-memory database, a document-oriented database, a real-time database, a relational database, an object-oriented database, a non-relational database, a NoSQL database, Hadoop® distributed file system ("HFDS"), or any other database known in the art.

Although shown as a single system, the functionality of system 200 may be implemented as a distributed system. For example, memory 214 and processor 222 may be distributed across multiple different computers that collectively represent system 200. In one embodiment, system 200 may be part of a device (e.g., smartphone, tablet, computer, etc.). In an embodiment, system 200 may be separate from the device, and may remotely provide the disclosed functionality for the device. Further, one or more components of system 200 may not be included. For example, for functionality as a user or consumer device, system 200 may be a smartphone or other wireless device that includes a processor, memory, and a display, does not include one or more of the other components shown in FIG. 2, and includes additional components not shown in FIG. 2, such as an antenna, transceiver, or any other suitable wireless device component. Further, when implemented to execute functionality disclosed herein, system 200 is a special purpose computer, specially adapted to provide customized and automated test functionality.

Figure 3:
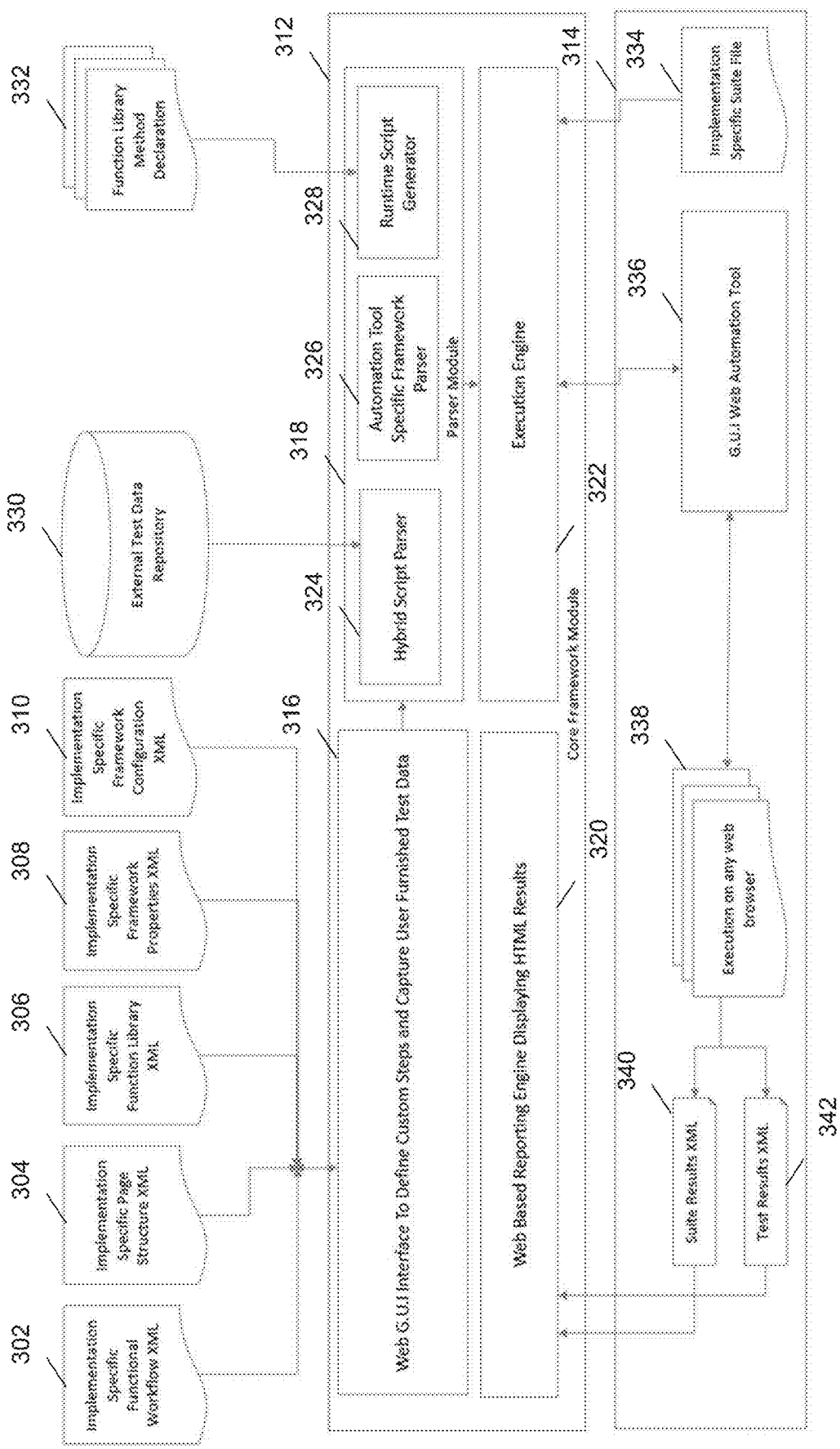
FIG. 3 illustrates another system for implementing a customizable enterprise automation test framework according to an example embodiment.

FIG. 3 illustrates another system for implementing a customizable enterprise automation test framework according to an example embodiment. The system illustrated in in FIG. 3 includes workflow definition 302, page structure definition 304, implementation function library 306, implementation framework properties 308, implementation framework configuration 310, framework module 312, automation tool 314, framework interface 316, parsers 318, reporting engine 320, execution engine 322, hybrid script parser 324, automation tool specific parser 326, runtime script generator 328, external test data 330, common function library 332, implementation suite file 334, web automation tool 336, test execution module 338, suite results 340, and test results 342. In some embodiments, the components of system illustrated in FIG. 3 can be used to implement customized automated tests for an enterprise web application (e.g., enterprise web site) and/or for different versions of an enterprise web application.

Figure 4B:
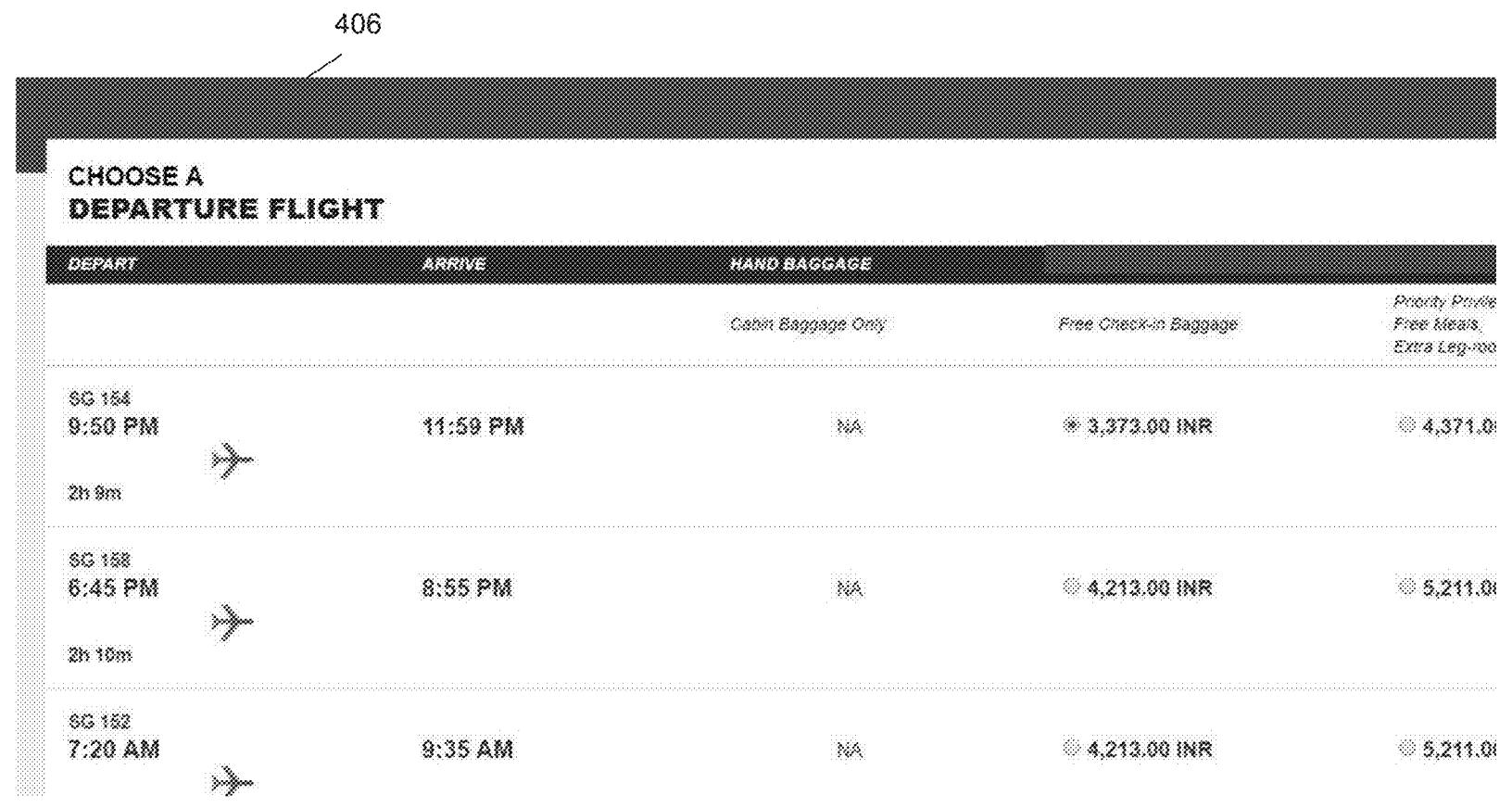
Figure 5A:
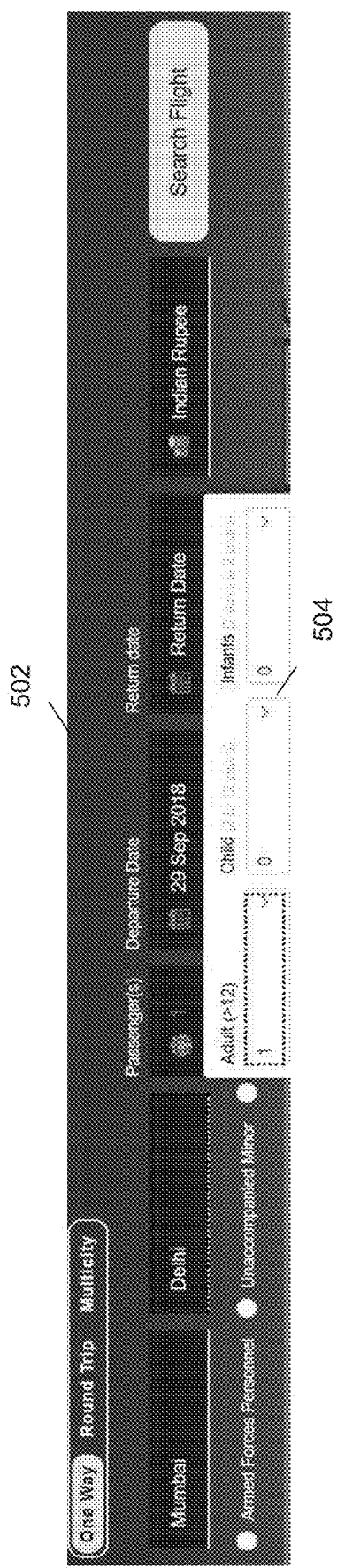
Figure 5B:
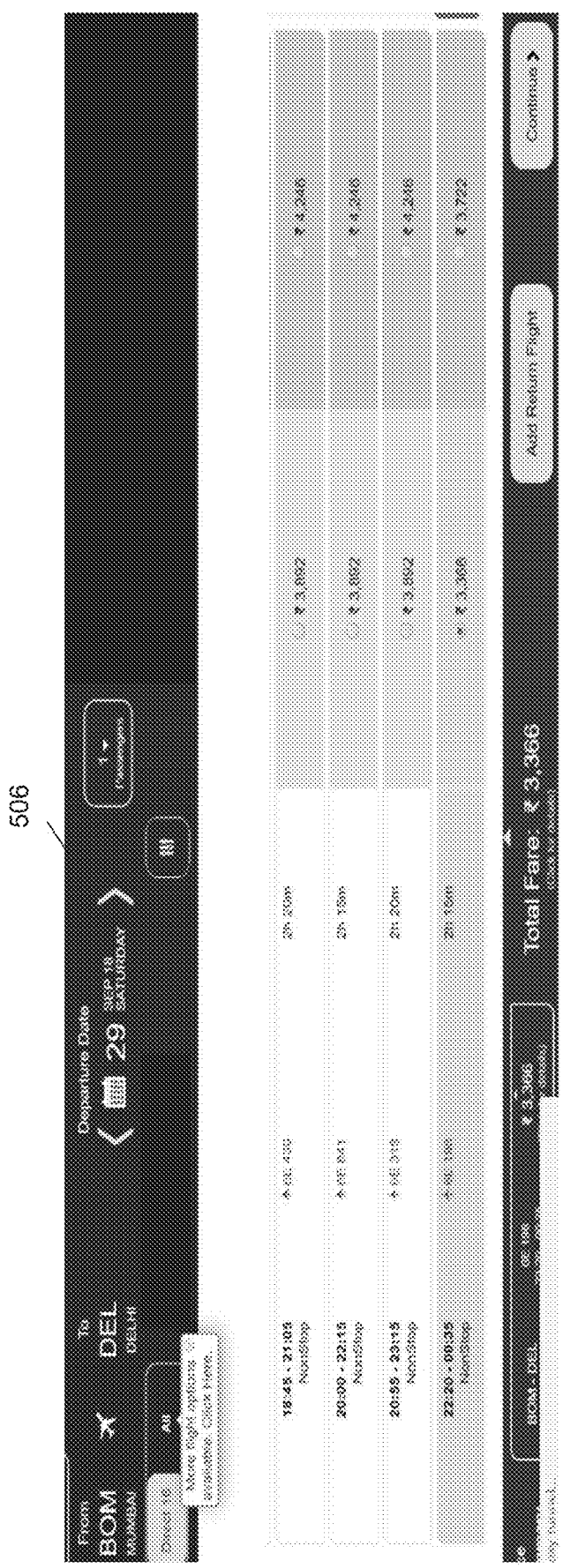

For example, FIGS. 4A, 4B, 5A, and 5B illustrate versions of an enterprise web application. User interface 402 of FIG. 4A depicts the landing page for a first airline web application used to book flights and user interface 502 of FIG. 5A depicts the landing page for a second airline web application used to book flights. For example, user interfaces 402 and 502 can be used to search for flights using parameters input into the depicted web elements. Similarly, user interface 406 of FIG. 4B depicts a flights results page for the first airline web application while user interface 506 of FIG. 5B depicts a flights results page for the second airline web application.

In some embodiments, the first airline web application and the second airline web application can be different variations of a common airline web application. For example, a web application provider/host can maintain a common airline web application that can be customized, and the first and second airline web applications can be different customized versions of this common airline web application. However, this is merely an example, and the first airline web application and second airline web application can also not share this commonality (e.g., not share a common web application). Embodiments demonstrate how the framework can implement customized and automated testing for these two customized enterprise applications efficiently.

User interface 402 of FIG. 4A depicts an example landing page where, by default, the Flights tab is enabled. In this example, there is a radio button to select One Way/Round Trip and by default it is set to One Way, and there are six fields, namely Departure City, Arrival City, web element 404 Departure Date, Passengers, and Currency. In this example, the Passengers field is by default set to "1 Adult" and the Currency field is by default set to "INR". When the Search icon is clicked, the enterprise web application retrieves the flights based on the matching criteria. At user interface 406 of FIG. 4B, the user can select the Flight number and Flight class and click on Continue to land on a passenger details page.

User interface 502 of FIG. 5A depicts a landing page where by default Book Flight is displayed. In this example, there are three radio buttons One Way/Round Trip/Multicity (instead of the two radio buttons depicted in user interface 402 of FIG. 4A) and One Way is set by default. Similar to user interface 402 of FIG. 4A, user interface 502 has six fields, namely Departure City, Arrival City, Passengers, Departure Date, and Currency. However, there are a number of deviations (e.g., customization changes) which wouldn't allow a typical automation script written for one implementation to run successfully for the other (and in some cases the script for the variation would be written from scratch). For example, when comparing user interface 402 of FIG. 4A to user interface 502 of FIG. 5A, the following variations can be seen:

- The Passenger field is displayed prior to the Departure Date field.
- The moment data is entered in one field automatically the contents of the next field are displayed as shown below.
- There are web element type differences (e.g., the passenger field in user interface 402 is a simple single select drop down whereas it is complex widget as shown by widget 504 of user interface 502).
- The internal DOM properties of the elements can also be different. For example, for user interface 402 the web elements could be identified using an "id" attribute. While, for user interface 502 many of the web elements can be identified using the "xpath" attribute.

Similar to user interface 406 of FIG. 4B, at user interface 506 of FIG. 5B, the user can select the Flight number and Flight class and click on Continue to land on a passenger details page. Embodiments implement customized automation tests for these variations of web applications using element of the system illustrated FIG. 3.

Figure 6A:
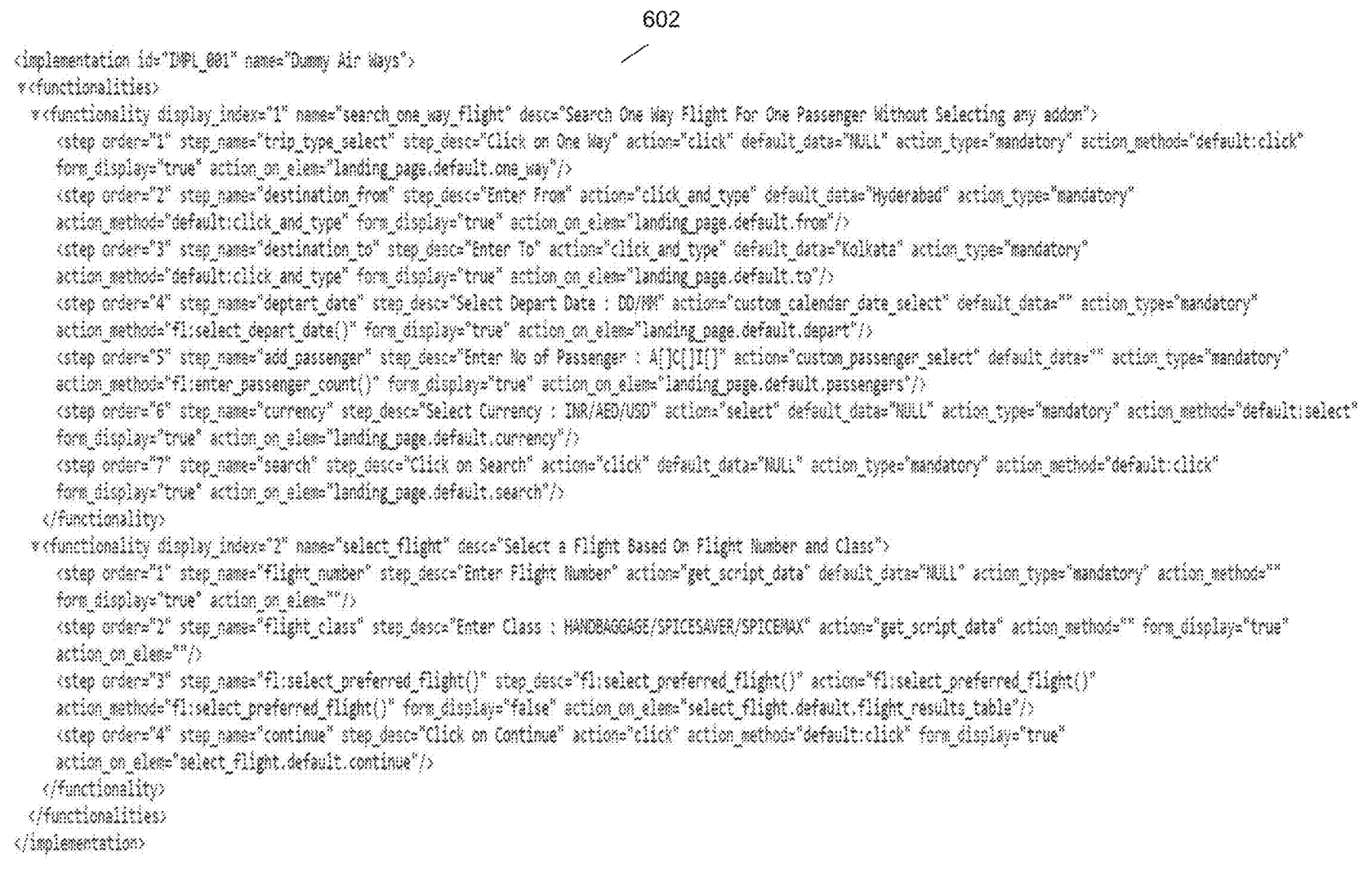

In some embodiments, workflow definition 302 defines one or more workflows, which can be a series of steps that together generate test cases/workflows for an enterprise web application. FIG. 6A illustrates an example workflow definition 602.

In some embodiments, each customized version of the enterprise web application would have its own version of workflow definition 602 (though a number of the definitions may be shared). This file (e.g., meta data, markup language, and/or XML file) defines the details of the functional workflows for the test cases along with the steps involved in each workflow.

In some embodiments, each step tag in workflow definition 602 has an attribute named as "action_method" which lists the relative name of the function that will be called to perform the step. The detailed arguments that the function takes can be listed in the function definition specific to the implementation, as further disclosed herein. The "action_on_elem" attribute is another attribute that refers to the web element on which the action is to be performed. In this example, the web elements are listed in the nomenclature as .<section>.<element name>.

In some embodiments, the details about the web elements can be found at the page structure definition specific to the implementation, as disclosed herein. The "desc" attribute can list the description of the step, which can be displayed in a web interface (e.g., use for creating the hybrid script). The functionalities listed in workflow definition 602 can be displayed in a framework web interface as steps that the user can select for creating the hybrid script, as disclosed herein.

FIG. 6B illustrates an example workflow 604 for searching a flight. For example, workflow 604 can be part of workflow definition 602 of FIG. 6A, namely the "Search One Way Flight for One Passenger Without Selecting any addon" workflow. In this example, there are seven steps listed:

Step 1: Selecting trip type option "one way or round trip"
Step 2: Selecting/Entering flying "From" location
Step 3: Selecting/Entering flying "To" location
Step 4: Selecting the departure date from the web calendar
Step 5: Selecting number of passengers who are flying
Step 6: Selecting the currency to be used for purchasing the flight ticket
Step 7: Clicking on flight search button to get the list of available flights based on these parameters.

Figure 6C:
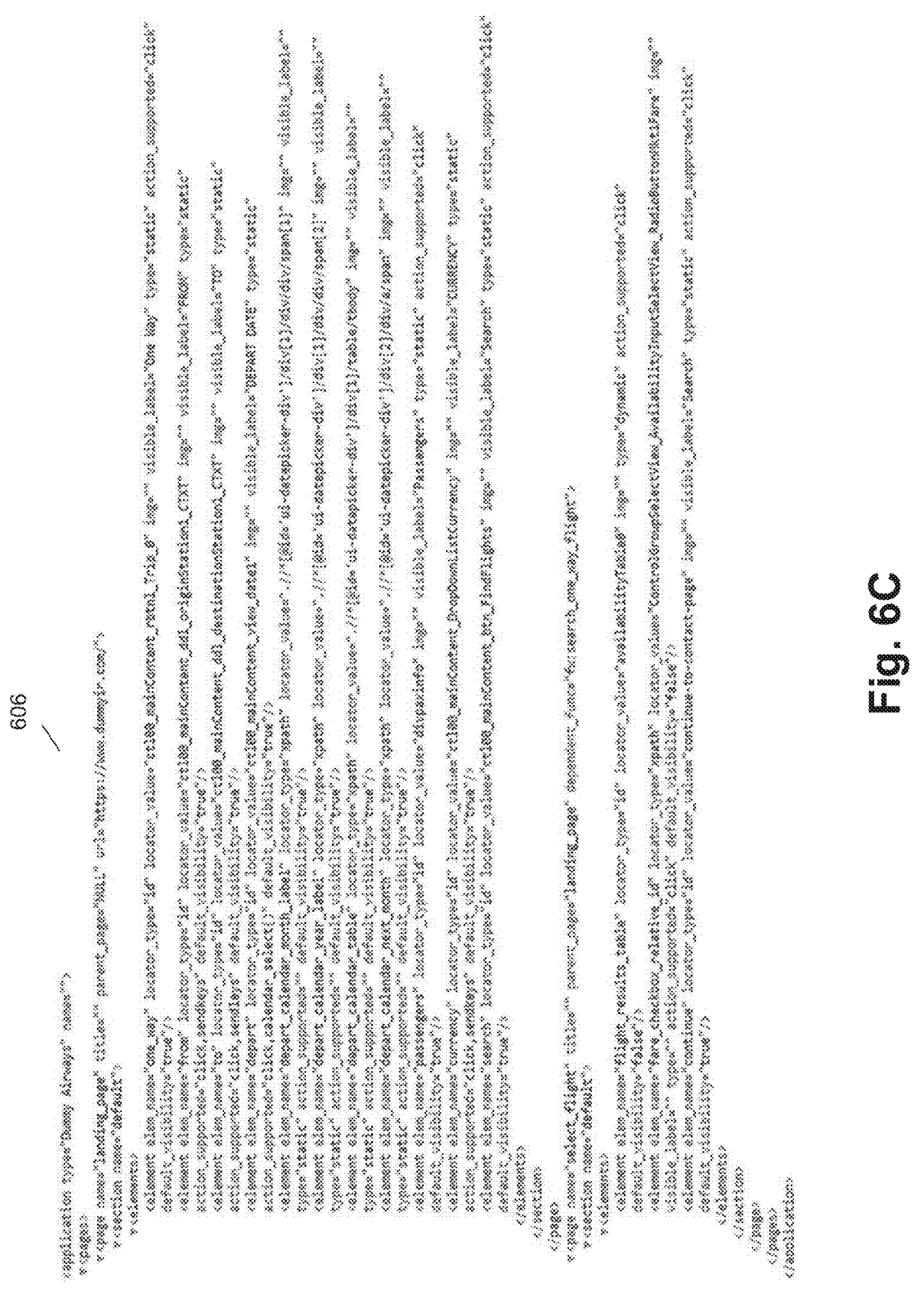

FIG. 6C illustrates page structure definition 606 (e.g., page structure definition 304 of FIG. 3). Page structure definition 606 (e.g., meta data, markup language, and/or XML file) can define the web elements on the customized enterprise web application (e.g., on which the customized automated test would exercise navigations, actions and assertions). In this example, the elements are structured using web page and sections.

In some embodiments, each variation (e.g., customized implementation) can include its own version of page structure definition 606. Web elements can have a "name" attribute which can be unique and, in some examples, can be referenced by a workflow definition file and/or a function definition file. The example "locator_type" attribute can define the DOM properties of the web element by which it can be uniquely identified in the page. The example "locator_value" attribute can list the values for "locator_type" attribute.

For web elements referenced when implementing the automated customized test, a hybrid script generator can refer to page structure definition 606 to get the details of the web element. This can then be passed to the underlying automation tool for identification purposes. In some embodiments, if a new automation tool is envisioned (e.g., one that looks for a unique property of the DOM for identifying elements), this property can be added as an attribute to page structure definition 606 and the corresponding value can be provided.

FIG. 6D illustrates an example function definition 610 (e.g., function definition 306 of FIG. 3). Function definition 610 (e.g., meta data, markup language, and/or XML file) can define the implementation specific functions used to implement a customized version of an automated test (e.g., called by workflow steps in performance of the test). For example, actions, navigations and assertions can be converted to a function and the details can be defined in function definition 610. For example, function 612 defines the function select_depart_date.

In some embodiments, the functions can also be structured into pages and sections for identification, addition, and/or modification. In this example, function tags can have a "desc_name" attribute which can be the name of the function. The example "type" attribute can identify the type of function navigation/assertion, and the like. The example "signature" attribute can specify the arguments that the function accepts. For example, consider the signature for the "navigation" function "select_depart_date" in function definition 608.

signature="select_depart_date('ps:landing_page.default. depart','ps:landing_page.default.depart_calendar_ month_label','ps:landing_page.default.depart_cal- endar_year_label','ps:landing_page.default.depart_ calendar_table','ps:landing_page.default.depart_cal- endar_next_month','data_user_form:fw:search_ one__way_flight.deptart_date')

In this example, the first argument is 'ps:landing_page.default.depart'. Here "ps" can represent "page structure" and "landing_page.default.depart" can be the unique identifier of the web element. The details of the web element 'landing_page.default.depart' can be obtained from the page structure definition (e.g., page structure definition 606 of FIG. 6C), which would be:

<element elem_name="depart" locator_type="id" locator_value="ctl00_mainContent_view_date1" img=" "visible_label="DEPART DATE" type="static" action_supported="click,calendar_select( )" default_visibility="true"></element>

In this example, the argument 'data_user_form: fw:search_one_way_flight.deptart_date' has two portions. The first part "data_user_form" can indicate that this function accepts test data from the framework web page (e.g., from the widget "Create Automated Test", as disclosed herein). In this example, in the second part "fw:search_one_way_flight.depart_date", "fw" refers to a workflow definition (e.g., workflow definition 602 of FIG. 6A) and the string after ":" can indicate the name of the web element "depart_date" as found under function name "search_one_way_flight" in the workflow definition (as illustrated in workflow definition 602 of FIG. 6A).

Embodiments of the framework include a form, web page, website, web application, dashboard, or any other suitable web entity, such as framework interface 316 of FIG. 3, that can be used to configure a hybrid script based on the disclosed definitions (e.g., workflow definition, page structure definition, and function definition). FIGS. 7A, 7B, 7C, and 7D illustrate user interfaces for configurating hybrid script generation for a customized automated test. User interface 702 can include web element 704 that can be used to select a workflow, web element 706 that can display steps of the selected workflow as web elements, and web element 708 that can be an editable field for entering the test departure date for the selected work flow.

Embodiments include user interface 702 as a web interface for configurating and creating a hybrid script according to customized automated test definitions and received input through the user interface. In some embodiments, the customized automated test name, URL, and hybrid script path can be provided in order to generate the interface.

Figure 7A:
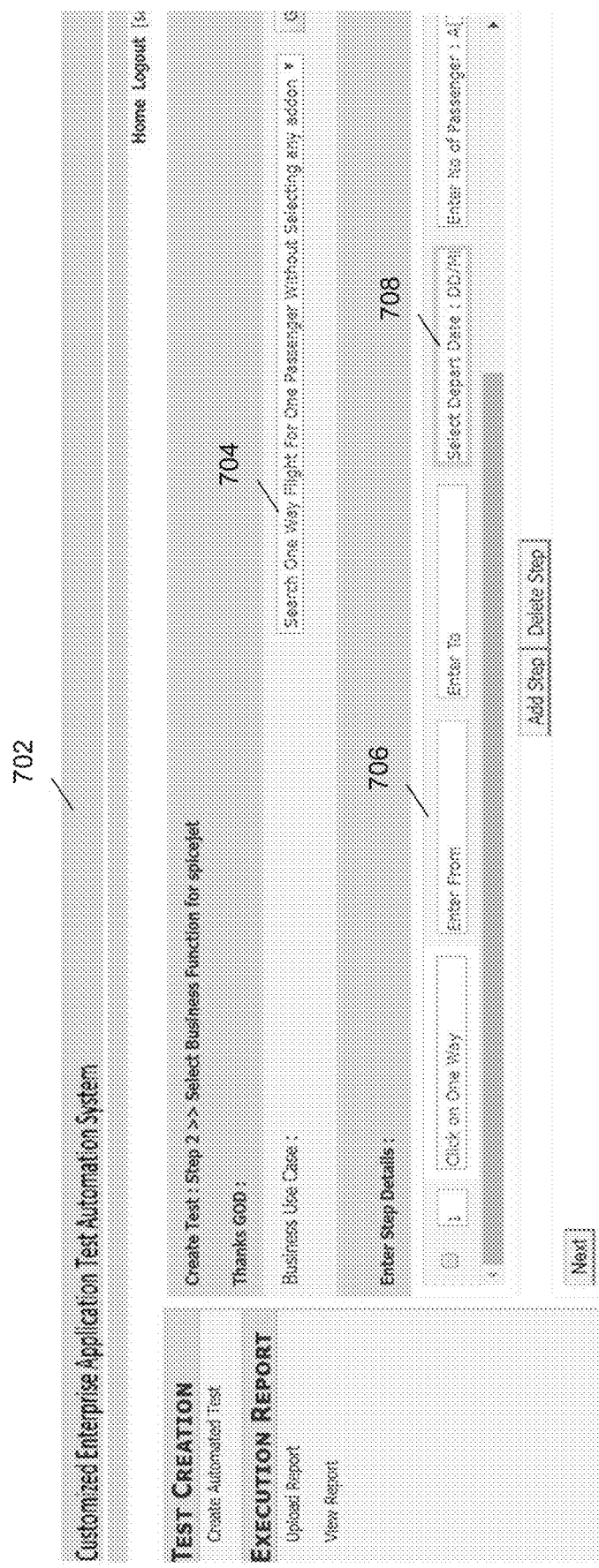
FIGS. 7A, 7B, 7C, and 7D illustrate user interfaces for configurating hybrid script generation for a customized automated test according to an example embodiment.
Figure 7B:
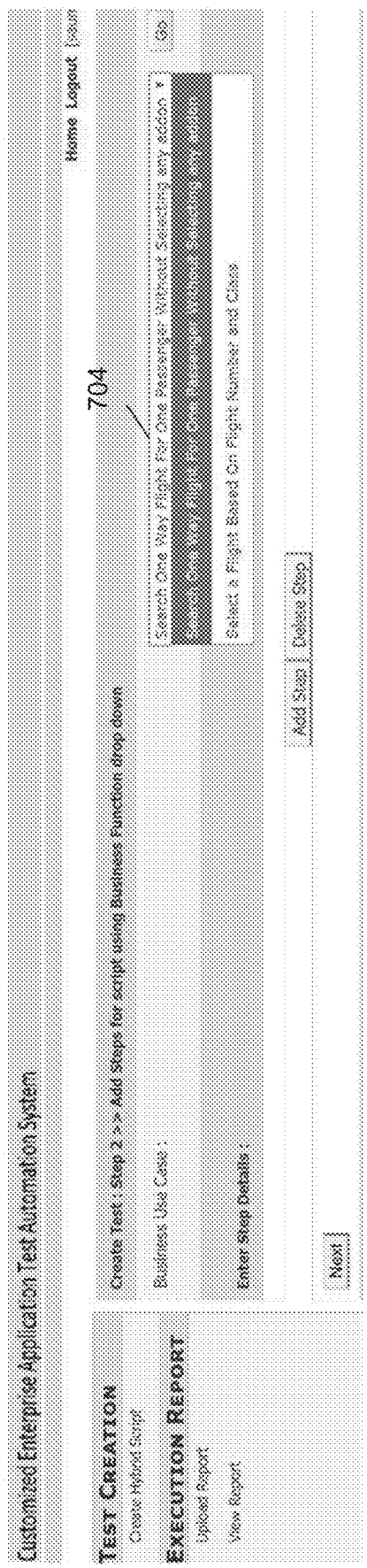
Figure 7C:
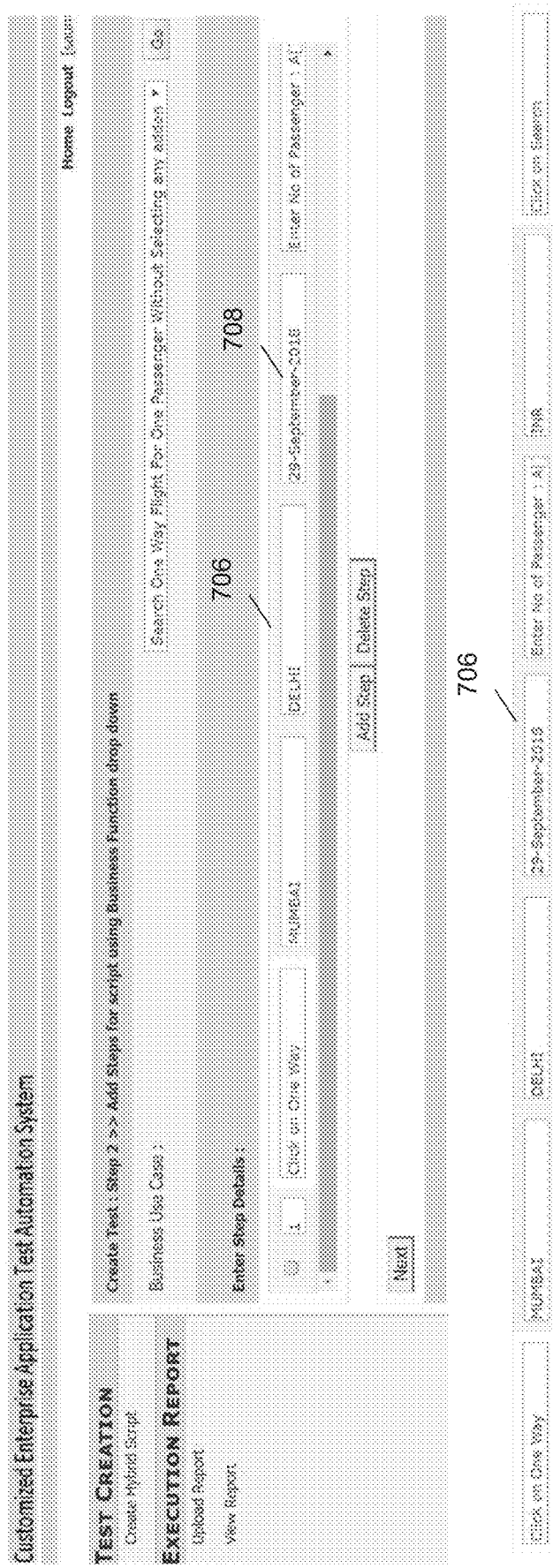

FIG. 7B illustrates web element 704, which is depicted as a drop down menu that is populated by the workflows from the workflow definition (e.g., workflow definition 602 of FIG. 6A). For example, automatically the web framework can retrieve the corresponding workflow definition, parse the file, and list the workflows as options in the "Business Use Case" dropdown. After selection of the workflow, the steps (as defined in the workflow definition) can be displayed in user interface 702. In some embodiments, the web interface can perform an AJAX call in order to retrieve/display the relevant steps of the selected workflow. For example, returning to FIG. 7A, web element 706 displays the steps of the selected workflow (e.g., Search One Way Flight for One Passenger Without Selecting any addon) as separate web elements.

In some embodiments, the steps can be displayed in the order represented by the workflow definition, and certain of the fields are editable when the step corresponding to the field is one that receives input. For those steps for which input data is not furnished by a user of user interface 702, non-editable web elements are displayed. For those steps for which a user is expected to enter input data, an editable web element is displayed, such as web element 708. For example, when a step is entered/displayed for which the "action_ method" function has an argument starting with "data_user- _form", an edit box can be dynamically rendered in user interface 702 for capturing user input for the hybrid script.

For example, interface 702 illustrates seven example fields corresponding to the selected workflow steps. These seven are displayed by web element 706 of FIG. 7C. Out of these seven fields, "Click on One Way" and "Click on Search" are shown as read-only. The remaining five fields, namely "From", "To", "Departure Date", "Number of Passengers" and "Currency", allow users to enter data. The values of "MUMBAI", "DELHI", "29-September-2018" and "INR" are entered in these fields. No value is entered in the passenger field in this example, as the corresponding enterprise web application being tested will automatically select the default passenger as 1.

Figure 7D:
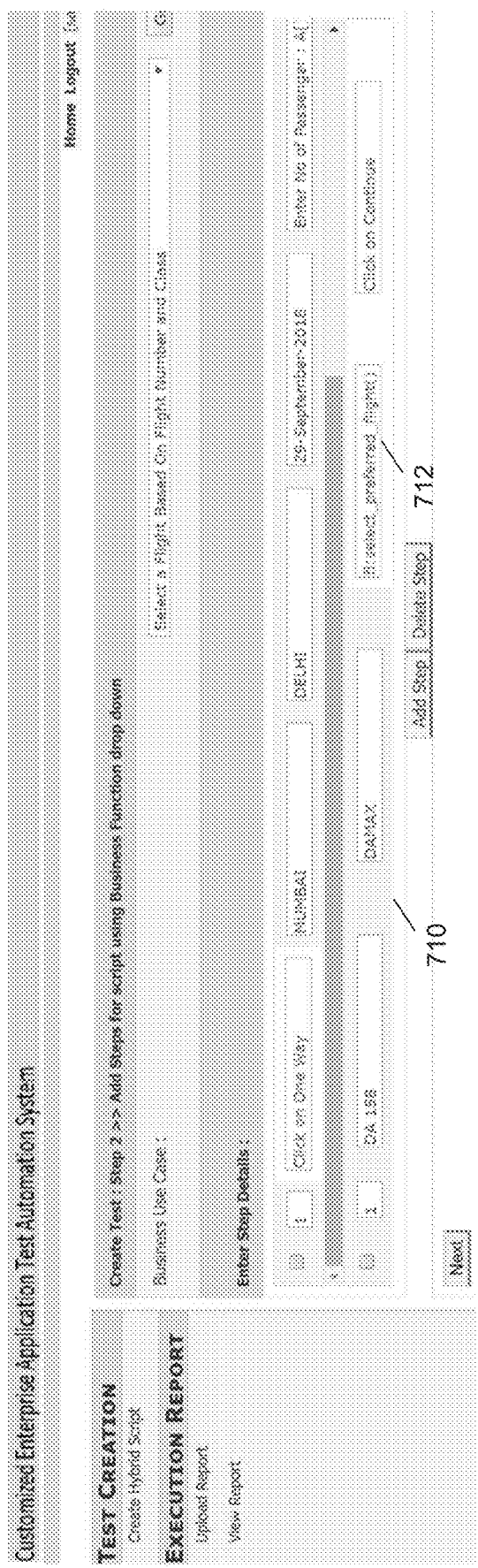

In an embodiment, configuring the steps of a workflow for the generation of a hybrid script can be considered a step of the hybrid script generation. Once the first selected work flow is configured, the "Add Step" button of user interface 702 can be used to select another workflow (e.g., from a drop down menu, as illustrated in FIG. 7B). FIG. 7D illustrates steps for a second selected workflow, namely "Select a Flight based on Flight Number and Class".

Web element 710 of FIG. 7D depicts four fields (e.g., corresponding to the 4 steps defined for the selected workflow in workflow definition 602 of FIG. 6A). In this example, the first two fields can be used to enter the flight number and flight class and the remaining two fields are not editable. Using the above sequence of actions depicted in FIGS. 7A, 7B, 7C, ad 7D, two script steps can be created for the hybrid script generation component (e.g., corresponding to two selected workflows and corresponding input information according to the steps of the workflows).

Figure 8:
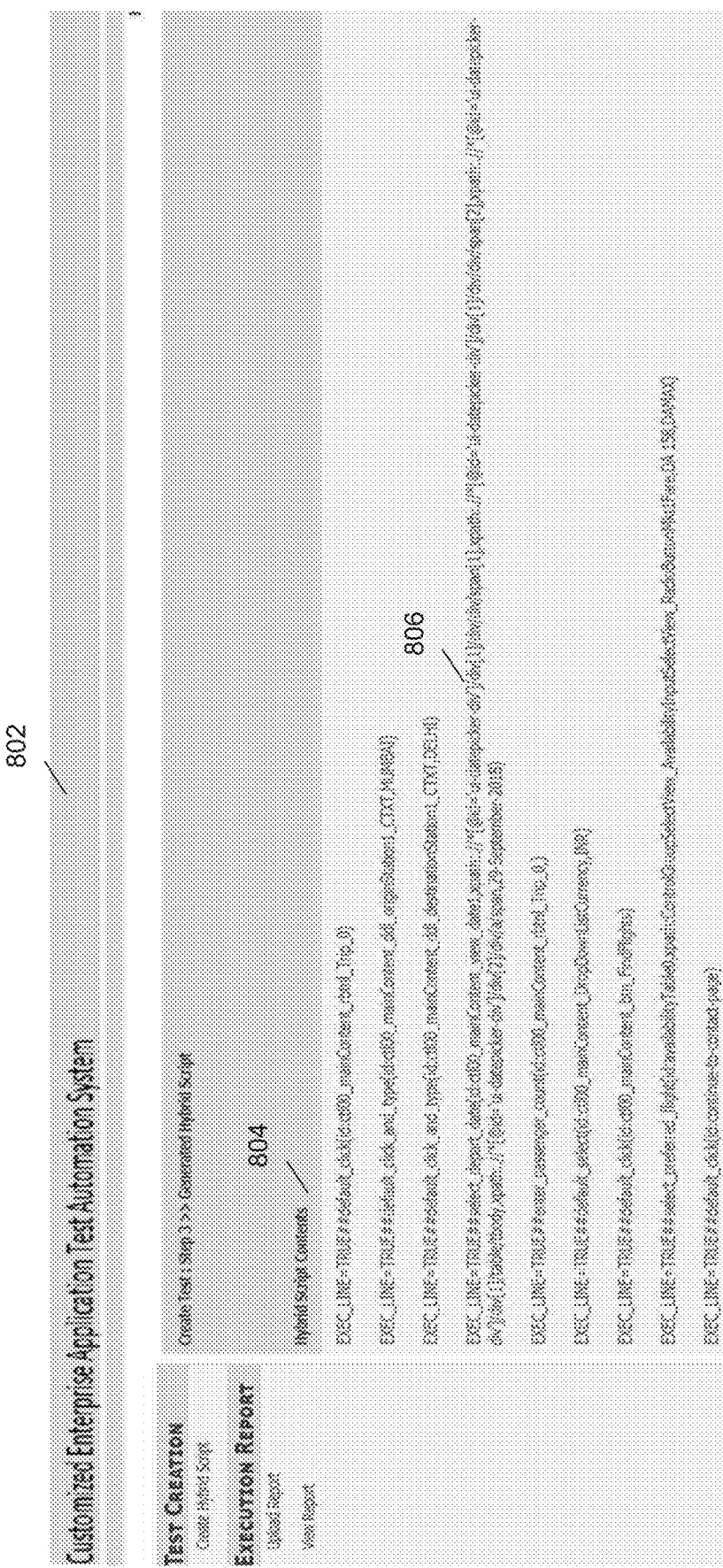
FIG. 8 illustrates a generated hybrid script according to an embodiment.

In some embodiments, after using interface 702 to configure the hybrid script, the hybrid script can be generated by the web framework. FIG. 8 illustrates a generated hybrid script according to an embodiment. For example, user interface 802 displays hybrid script 804, which can include a representation of the customizable automated test (e.g., selected workflows and configured steps of the workflows) configured using user interface 702.

In some embodiments, a hybrid script generator/parser (e.g., hybrid script parser 324 of FIG. 3) can parse the relevant definitions (e.g., workflow definition 602 of FIG. 6A, page structure definition 606 of FIG. 6C, and function definition 610 of FIG. 6D) to generate the hybrid script contents. For example, hybrid script parser 324 can be responsible for parsing the implementation specific definition files and generating the hybrid script (e.g., based on the data selected by the user from the web interface and the framework configuration). Thy hybrid scripts are generated specific to a customized implementation of an enterprise packaged web application.

In some embodiments, the hybrid script parser can be a unique parser algorithm (e.g., developed using JAVA). For example, the hybrid script parser can generate a hybrid script specific to an implementation. In some embodiments, the hybrid script parser can parse the definition files (e.g., workflow definition 602 of FIG. 6A, page structure definition 606 of FIG. 6C, and function definition 610 of FIG. 6D). These definitions can be designed in such a manner so that they can be cross referenced in order for the framework to develop a comprehensive view of the implementation. For example, the cross referencing can be achieved using tags and attributes (e.g., of markup definition files).

In some embodiments, the hybrid script generation is performed using a web interface (e.g., as illustrated in FIGS. 7A, 7B, 7C, and 7D). For example, once a user selects a workflow (e.g., using element 704 of FIG. 7B), the hybrid script parser can be initiated. The hybrid script parsers can parse the workflow definition to retrieve the steps of the selected workflow. To get details of elements encountered in steps, it can parse the page structure definition. Then, for actions (e.g., action_method within the definitions) the parsers can refer to the function definition to get detailed function calls.

In the illustrated example in FIG. 8, the prefix "EXEC_LINE" indicates whether line is to be executed while implementing the script. By default lines in the hybrid script contents can be set to "TRUE". If set to "FALSE" the corresponding line is skipped at the time of execution.

Hybrid script 804 includes methods calls which are standard methods and can be used across implementations (e.g., starting with the language "default_"). For example, a common library (e.g., common function library 332) can be maintained that can work across multiple customizations/implementations. For example, these common methods can be different from the specific methods defined in the function definition (e.g., function definition 610 of FIG. 6D). In some embodiments, the function definition is separate and is maintained for the individual customizations to include methods/functions that are customized.

For example, in hybrid script 804, line 806 includes the function "select depart date", which is a specific function defined in the function definition for the particular customization associated with this hybrid script/customized automated test. Hybrid script 804 also includes the function "select_preferred_flight", which can be different for different enterprise web applications/customizations. For example, FIGS. 4A and 5A depict different enterprise web applications, and thus each can have its own set of definitions that are parsed to generate a hybrid script (and subsequent run time script). Thus, while these two implementations may use the same method name in a hybrid script, at run time the "select_preferred_flight" method from the function library corresponding to the implementation/customization will be used.

In some embodiments, for parameters in a function call which includes 'data_user_form', they framework expects user entered data from the web interface form (e.g., such as elements 706 and 708 of FIG. 7A). In some embodiments, this parsing functionality can be repeated by the hybrid script parser for the various workflow steps entered in the web interface. The hybrid script parser can then generate a custom text based nomenclature (e.g., illustrated by hybrid script 804 of FIG. 8).

In some embodiments, for forms where a user is expected to enter data manually, this data can be obtained from an external test data repository (e.g., external test data 330 of FIG. 3). In this case, instead of entering data, a nomenclature like 'db:<sql_file_name>' can be entered, which the hybrid script parser can interpret. For example, the hybrid script parsers can determine to execute a query (e.g., SQL query) against a database, and the result set can be the data to be used (e.g., the form value). Similar configuration can also be done to retrieve data from other formats (e.g., worksheets, such as Excel worksheets, XML format, and the like).

In some embodiments, for each implementation/customization there is an implementation specific framework configuration file (e.g., implementation framework configuration 310 of FIG. 3). FIG. 9A illustrates an example implementation framework configuration 902. For example, implementation framework configuration 902 can include details of the suite to be run, the automation tool to be used, and the like. As displayed, the automation tool (e.g., automation tool 314 of FIG. 3) in the illustrated example is Selenium, however any open source, commercial, or any other suitable automation tool can be defined, as the framework is loosely coupled with the underlying the automation tool. The example "suite_to_exec" tag has details of the suite to execute specific to the implementation.

In some embodiments, for each implementation/customization there is an implementation specific framework parameter file (e.g., implementation framework properties 308 of FIG. 3). FIG. 9B illustrates an example implementation framework properties 904. For example, the implementation framework properties 904 can include details regarding the implementations that the definitions/customization would be supporting. The framework can refer to this file for details specific to an implementation. For example, the enterprise web applications illustrated in FIGS. 4A and 5A are both listed in implementation framework properties 904. FIG. 9C illustrates an example implementation suite file 334. The implementation suite file 334 can include details of the hybrid script to be executed. Multiple scripts can be listed in this file.

Referring back to FIG. 3, the generated hybrid script can then be processed (e.g., by automation tool specific parser 326 and run time script generator 328) to generate a run time script. For example, automation tool specific parser 326 parses the automation tool specific native methods and the hybrid script in order to generate an interim format to be used by the runtime script generator. Run time script generator 328 takes the interim format (passed by automation tool specific parser 326) along with the custom business specific automation methods defined in the function libraries and generates a runtime script which can be executed using a specific automation tool.

In some embodiments, automation tool specific parser 326 operates in tandem with the function definition (e.g., function definition 610 of FIG. 6D) in order to come up with an interim run time script format. For example, a hybrid script can have a method name, such as "default_click", and the framework can understand that the prefix "default" indicates that a standard native click method of any automation tool should be use for this action. Automation tool specific parser 326 can then convert this default_click method to the tool specific click format. In an example where the automation tool is Selenium, the hybrid script line: "default_click(id:ct100_mainContent_rbtnI_Trip_0" can be converted to Selenium specific code "driverfindElement(By.id("ct100_mainContent_rbtnI_Trip_0")).click( );".

In some embodiments, when the method is not a native method, the framework can look to the function definition to determine if the method is declared and uses it for runtime execution. Using this information, automation tool specific parser 326 can generate a structured script specific to the programming language (e.g., which the automation tool supports) that is to be executed using the specific tool. In some embodiments, the runtime script generator allows last level customizations and last level enforcements on the script before it is executed.

Referring back to FIG. 3, in some embodiments, automation tool 314 and execution engine 322 communicate and execute the generated run time script (e.g., using web automation tool 336 and test execution module 338) to generate results from the execution of the customized automated test. The results can include suite results, individual workflow results, and/or individual steps within the workflow results, where the results can indicate a relevant status (e.g., Pass, Fail, Skip, and the like). In some embodiments, results can be generated (e.g., from the automation tool) as files (e.g., markup language and/or XML files) that can be processed and rendered in a web format (e.g., HTML).

For example, FIG. 9C illustrates example suite results 906 (e.g., suite results 340 of FIG. 3). The suite results 906 shows an execution status at a suite level. For example, the suite execution status is a "PASS" if all tests in the suite has passed. Embodiments also include results at a more granular level (e.g., test results 342).

Figure 9D:
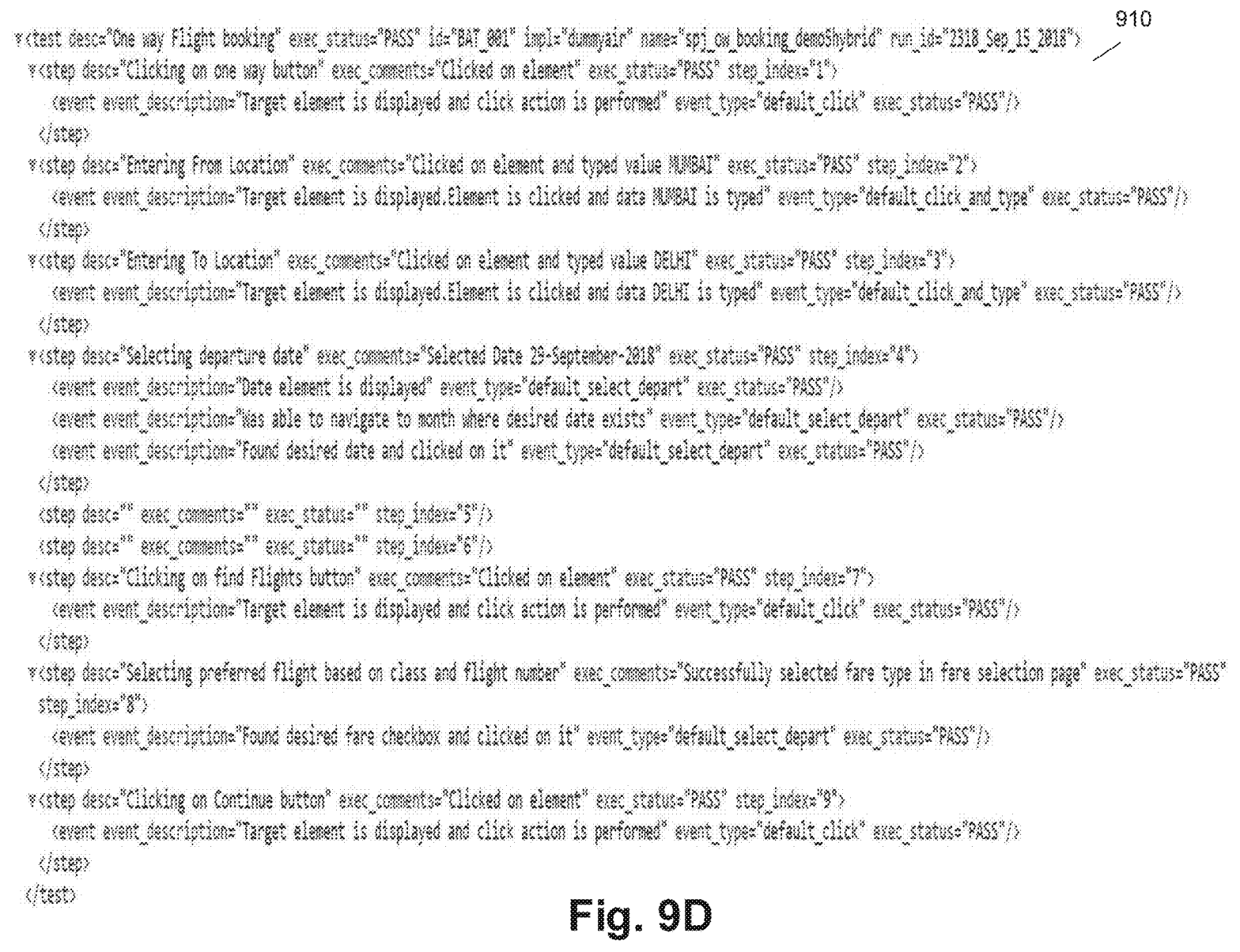

For example, FIG. 9D illustrates example test results 908. The test results 908 show an execution status at each step (e.g., of a workflow) and event level (e.g., sub-steps within a step). For example, the events can be specified at the function library code level. In some embodiments, the step execution status is set to "PASS" if all the events in a step passed. In some embodiments, the test execution status is set to "PASS" when all steps execution status (except the ones skipped) are se to "PASS".

In some embodiments, the framework web reporting engine (e.g., reporting engine 320 of FIG. 3) parses the suite and test results and displays them in an HTML format. In some embodiments, the framework web layer can be implemented in a Linux platform while the test execution can occur in a Windows platform. Here, the suite and test results files can be generated in Windows and can then be uploaded to Linux (e.g., using a framework web interface "Upload Report"). For example, once the reports are uploaded, the results can be viewed by clicking on "View Report". In some embodiments, in a "Enter Results File Path" field, the Linux folder where the reports are uploaded is specified. The reporting engine can check the folder and identify the results files (e.g., XML files).

Figure 10A:
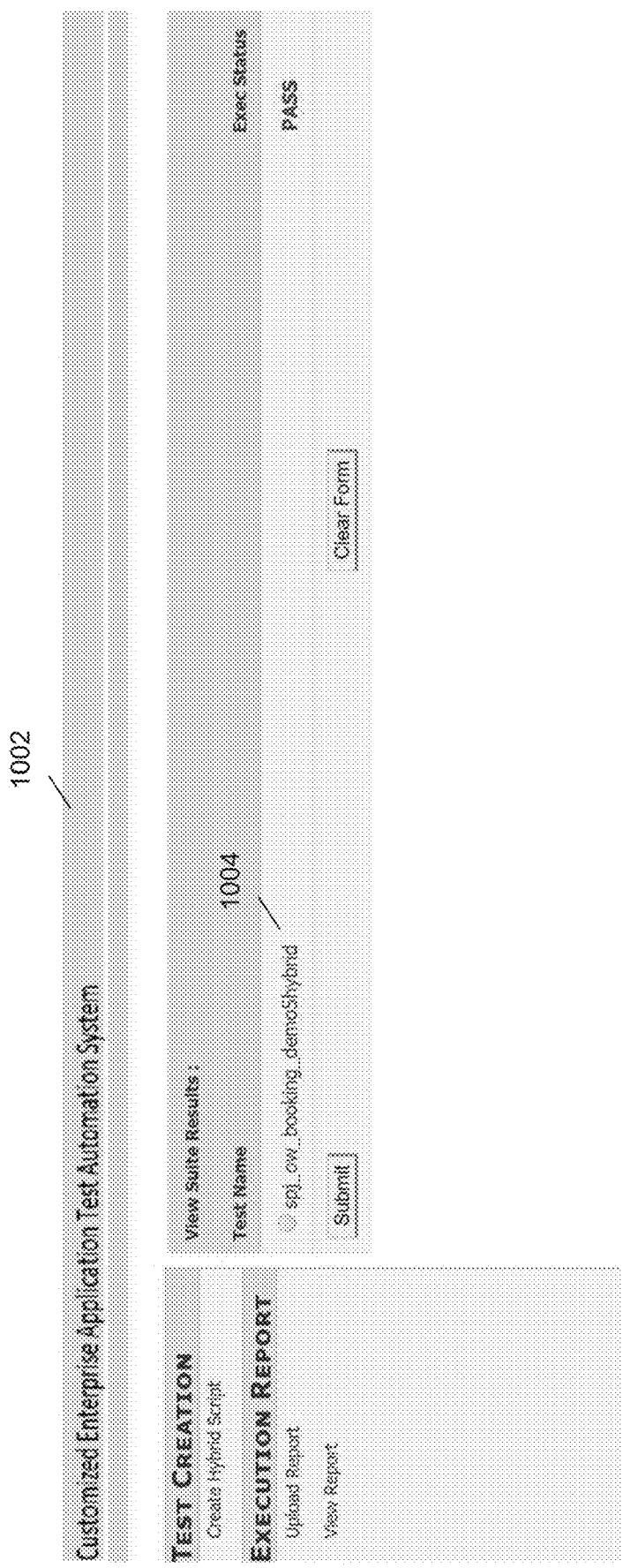
FIG. 10A illustrates a suite level results web page according to an example embodiment.
Figure 10B:
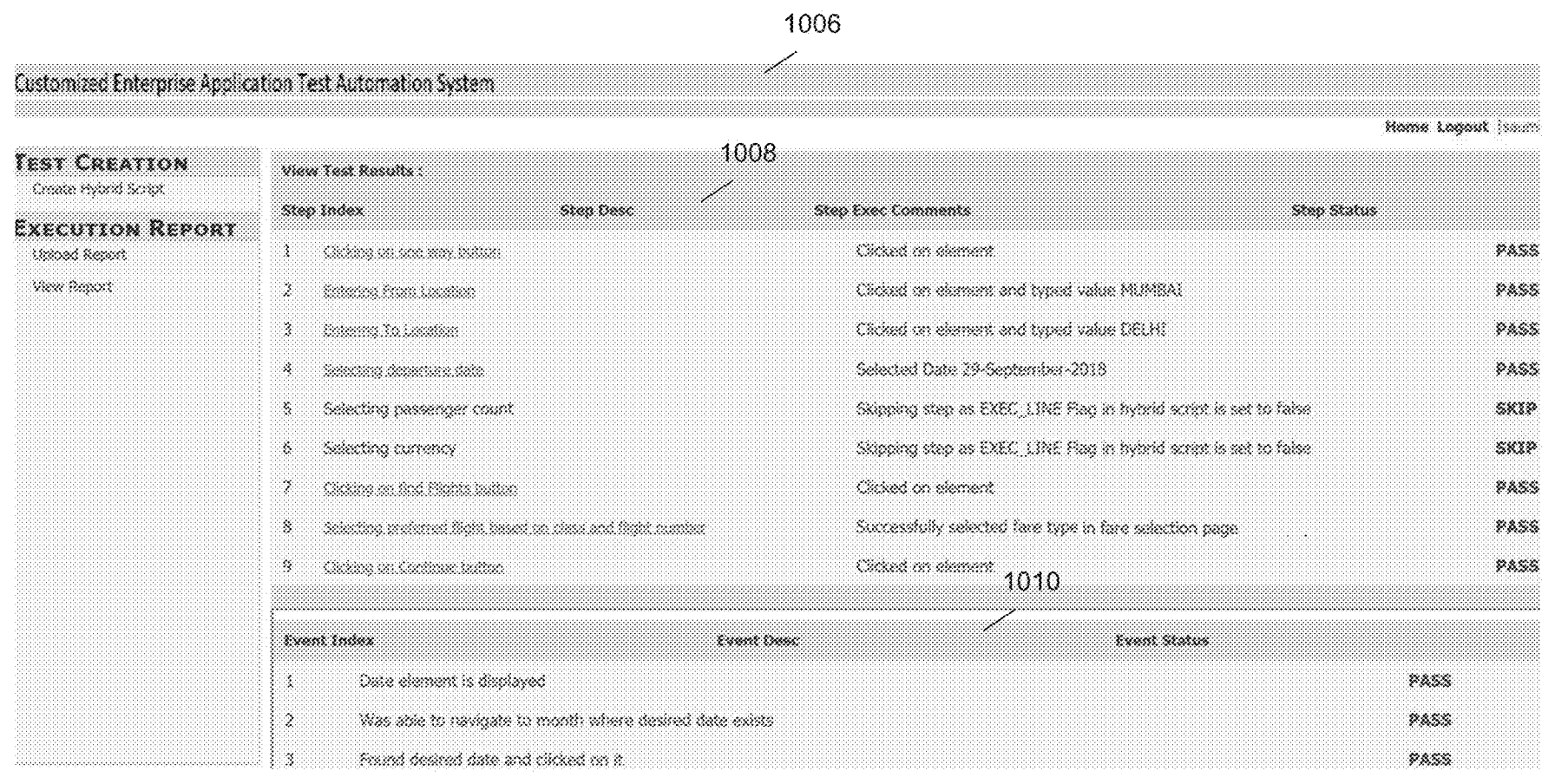

FIG. 10A illustrates a suite level results web page. User interface 1002 shows suite results 1004 (e.g., Pass for the displayed test). The illustrated radio button can be selected to further explore the results. FIG. 10B illustrates a detailed test level results web page. User interface 1006 includes web element 1008 that displays results for the relevant steps (e.g., for a workflow that was used for the test) and one or more of these steps can be selected such that web element 1010 shows the event level execution status within a selected step.

FIG. 10C illustrates example test results with a fail status. User interface 1012 includes web element 1014 that includes multiple steps with a failed status (e.g., at select preferred flight, step 8). Log files can further indicate why the failures occurred, for example due to a failure to render the page on time, which resulted in that step and subsequent step failing.

In some embodiments, the framework can be configured to automatically perform pre-requisite activities depending on what action is selected. This can be achieved through the parent_page attribute and dependent_action attributes (e.g., in the function library XML). For example, from the web interface (e.g., used to generate the hybrid script) if instead of adding the step details of searching for a flight, a user adds step details for selecting a flight from the search results, then in the hybrid script the following example line can be generated:

"EXEC_LINE=TRUE##select_preferred_flight(id:availabilityTable0,xpath:ControlGroupSelectView_AvailabilityInputSelectionView_RadioButtonMkt1Fare, D A 158,DAMAX)"

When parsing this line, the framework can refer to the functional library definition and there it can find that the dependent action for select_preferred_flight is "fw:search_one_way_flight" (as illustrated in FIG. 6D). In some embodiments, the framework realizes that some prerequisite actions are to be performed and for that it can refer to the functional workflow definition (as illustrated in FIG. 6B). For example, the workflow definition can include the steps of the search_one_way_flight workflow and these can be executed with the default data included in the definition prior to invoking the "select_preferred_flight" action.

Embodiments include customized automated tests for multiple web applications. Here, FIGS. 6A, 6B, 6C, 6d, 7A, 7B, 7C, 7D, 8, 9A, 9B, 9C, 9D, 10A, 10B, and 10C illustrate a customized test implementation for the web application illustrated in FIG. 4A. FIGS. 11A, 11B, 11C, and 11D illustrate user interfaces for configurating hybrid script generation for another customized automated test, namely a test customized for the enterprise web application illustrated in FIG. 5A.

Embodiments of these customized test can be similar, for example due to the improved design of the framework. However, each customized automated test can have its own set of definitions (e.g., workflow definitions, page structure definitions, and function definitions). The customizations present in these definitions can produce a hybrid script, function library, and ultimately a run time script that is customized to the given implementation.

Figure 11A:
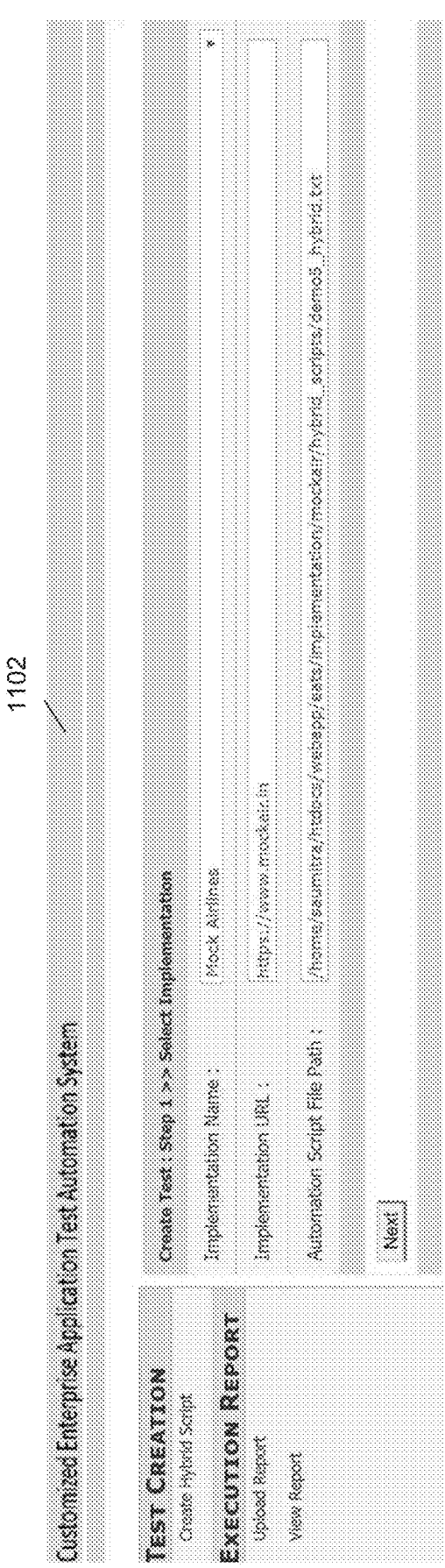
Figure 11B:
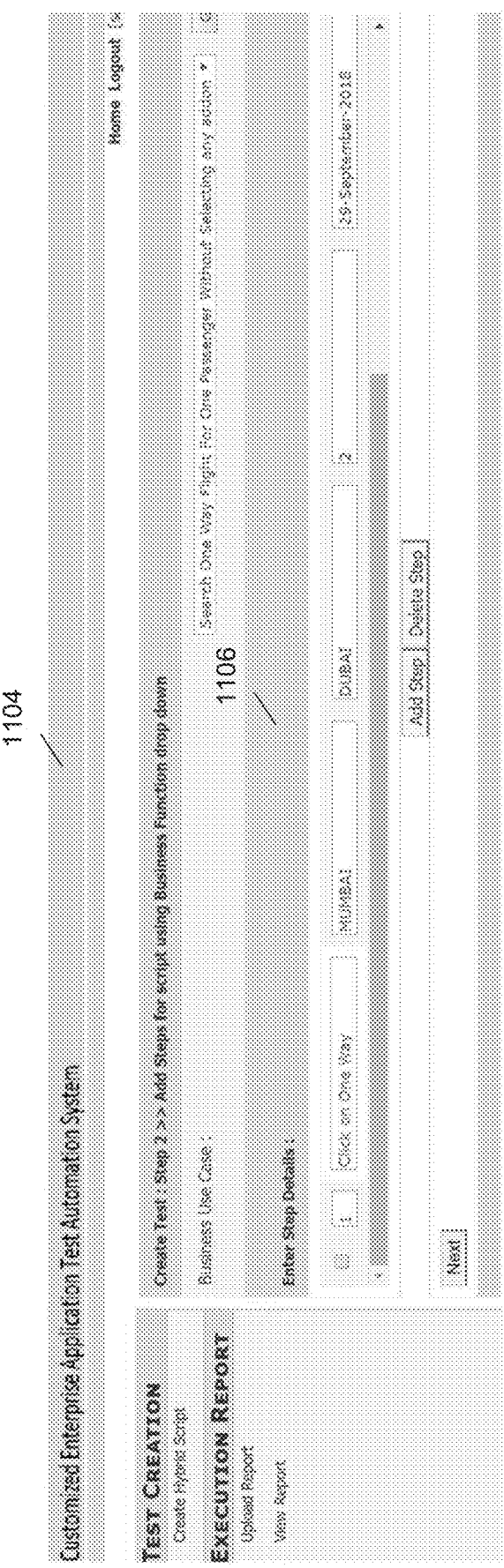

For example, FIG. 11A illustrates user interface 1102, which can be used to specify the implementation name, URL, and script path that is specific to the customized automated test. User interface 1104 of FIG. 11B illustrates the steps of a selected workflow, namely "Search One Way Flight for One Passenger Without Selecting any addon" (e.g., a similar workflow as the one discussed with reference to the customized test for the previous enterprise web application).

Figure 11C:
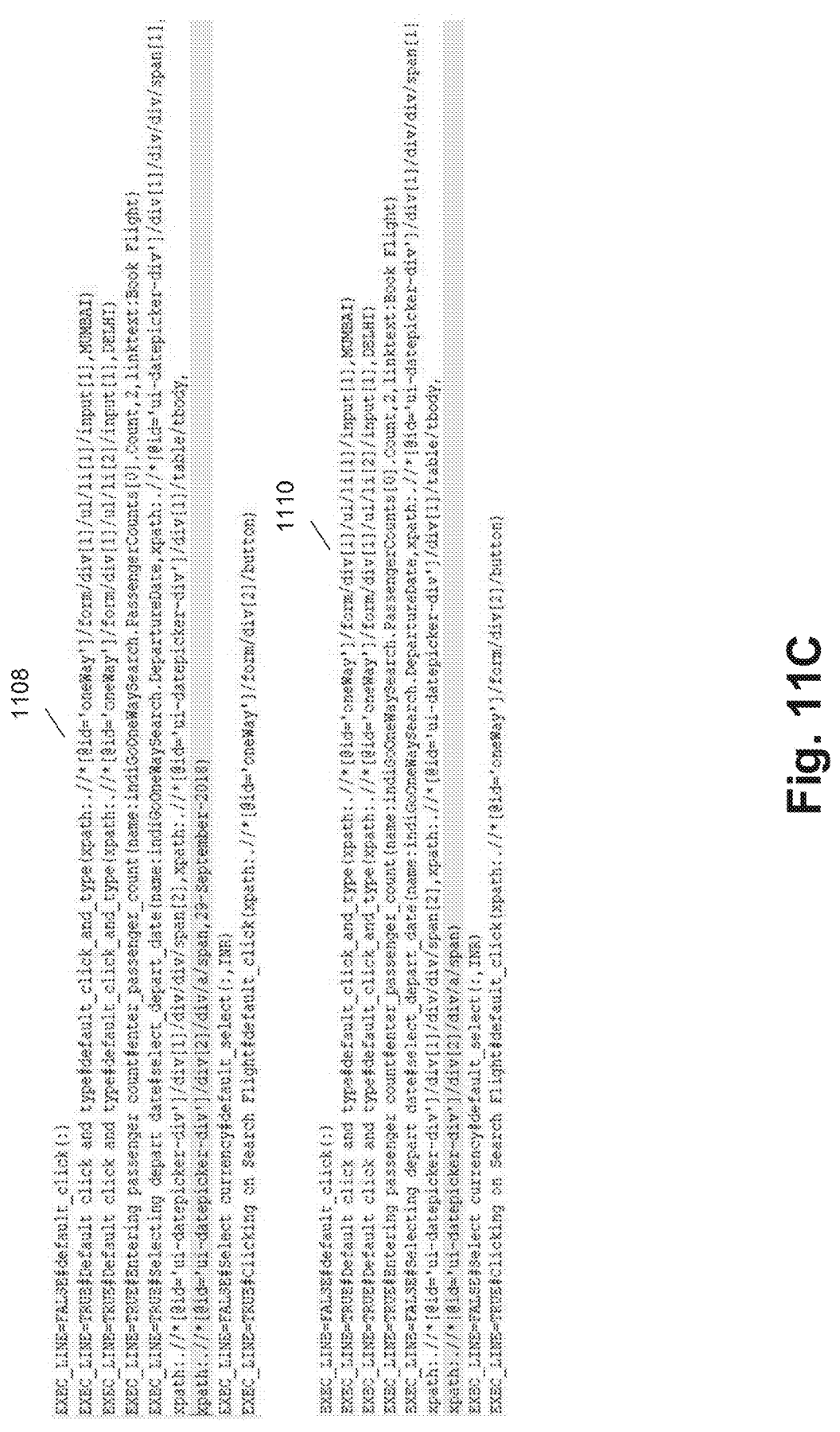

However, web element 1106 illustrates the steps for the current workflow, and based on the definitions (e.g., workflow definitions) for this enterprise web application, a passenger count is entered. Indeed, the steps may look different than the previous implementation of this similar workflow based on difference in the workflow definitions. FIG. 11C illustrates hybrid scripts 1108 and 1010 that result from the user configurations.

In some embodiments, edits can be made to the generated hybrid script, for example to adjust the run time script generated and change the performance of the automated test. In an example, Line 1 (as default radio button selection is One Way) and Line 6 (as currency is also by default se to INR) can be skipped. In order to skip these two steps, the EXEC_LINE flag can be set to "FALSE", as illustrated in hybrid script 1108.

In some embodiments, a test a scenario can be requested that checks the flight availability for next day based on the default settings. In this case, the hybrid script can be modified to set EXEC_LINE=FALSE for step 5, as illustrated by hybrid script 1110. FIG. 11D illustrates the test level results of this modification. As evident from the report displayed in user interface 1112, the test has passed and steps 5 and 6 are skipped as EXEC_LINE was set to FALSE.

Figure 12:
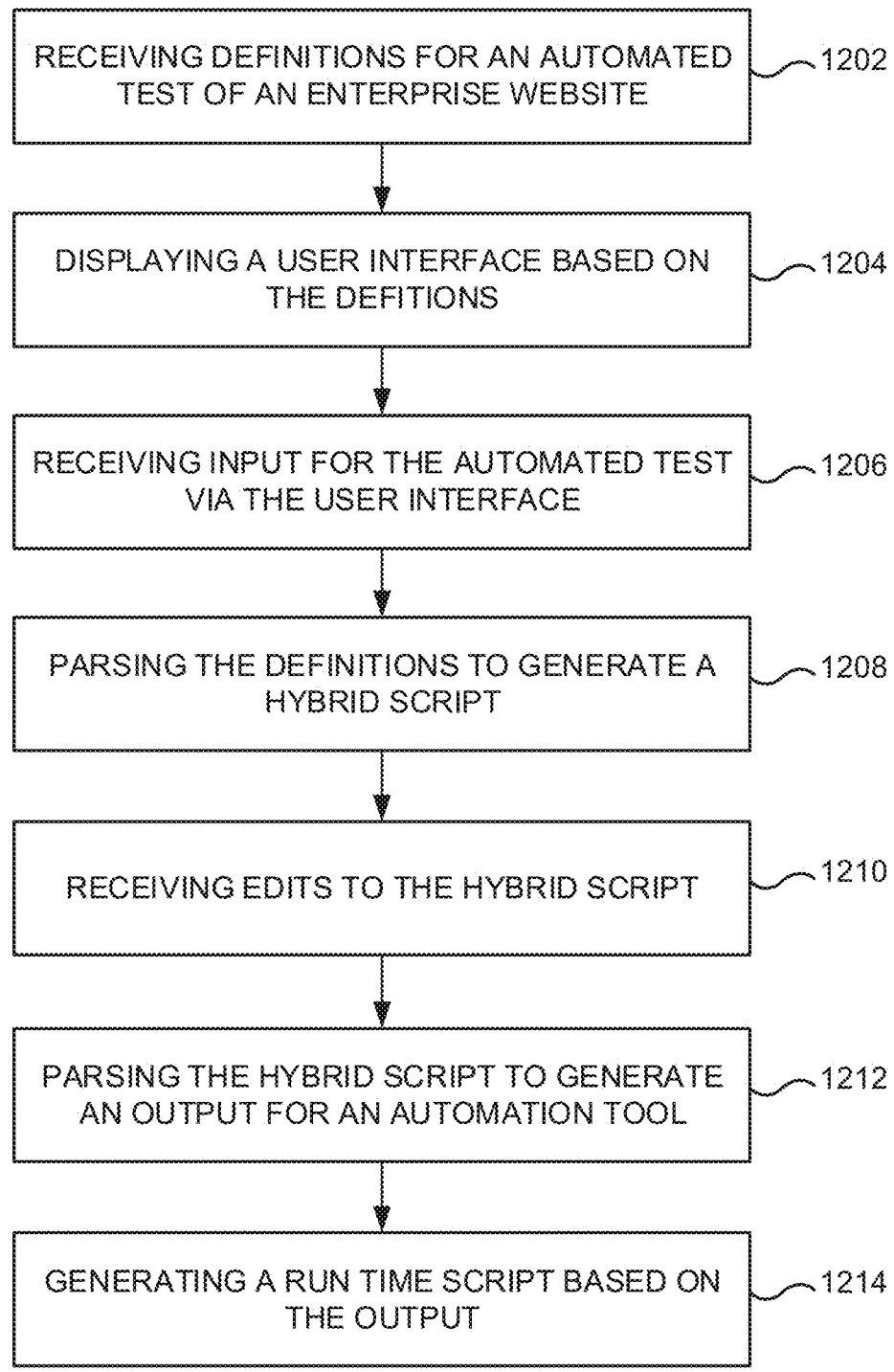
FIG. 12 illustrates a flow diagram for implementing a customizable enterprise automation test framework according to an example embodiment.

FIG. 12 illustrates a flow diagram for implementing a customizable enterprise automation test framework according to an example embodiment. In one embodiment, the functionality of FIG. 12 is implemented by software stored in memory or other computer-readable or tangible medium, and executed by a processor. In other embodiments, each functionality may be performed by hardware (e.g., through the use of an application specific integrated circuit ("ASIC"), a programmable gate array ("PGA"), a field programmable gate array ("FPGA"), etc.), or any combination of hardware and software. In embodiments, the functionality of FIG. 12 can be performed by one or more elements of system 200 of FIG. 2.

At 1202, a workflow definition, a page structure definition, and a function definition for an automated test of an enterprise website is received. For example, the workflow definition can define one or more workflows for one or more test cases that include a series of steps, the page structure definition can define web elements that include a plurality of web pages of the enterprise website, and the function definition can define enterprise website specific functions referenced by steps of the one or more workflows.

At 1204, a user interface can be displayed based on the definitions. For example, a user interface for configuring the generation of a hybrid script can be displayed. In some embodiments, one or more workflows can be selected such that a customized automated test can be generated for the enterprise website.

At 1206, input can be received from a user for the customized automated test via the user interface. For example, a user can select one or more workflows for the test. Steps for the one or more workflows can be configured, such as by receiving inputted values in fields that correspond steps, where the values are used in performance of the test.

At 1208, a hybrid script parser parses the workflow definition, page structure definition, and function definition to generate a hybrid script for the automated test. For example, the hybrid script can be generated based on the workflow selections and input received via the user interface.

At 1210, edits to the generated hybrid script can be received. For example, edits that change the run time script and ultimately the performance of the automated test can be received for the hybrid script via a user interface. The edits can include edits to a flag that indicate to skip one or more steps of a workflow.

At 1212, an automation tool parser can parse the hybrid script to generate an output for an automation tool. At 1214, based on the output from the automation tool parser, a runtime script can be generated that is executed by the automation tool to generate results for the automated test. For example, the automation tool can implement the steps of the one or more workflows on the plurality of web pages of the enterprise web site to generate the results for the automated test.

Embodiments implement a customizable enterprise automation test framework that improves the efficiency and flexibility of performing automated testing on a web presence (e.g., web application or website). For example, definitions for an enterprise website can be used to generate a hybrid script, the hybrid script can be parsed to generate a run time script, and the run time script can be used by an automation tool to implement automated tests on the enterprise website.

In some embodiments, the definitions can include workflow definitions, page structure definitions, and functionality definitions. For example, workflow definitions can define workflows that include a series of steps to be performed for a test. Page structure definitions can define the web elements for web pages of an enterprise website. Function definitions can define enterprise website specific functions that are used to perform the enterprise website test (e.g., functions that are called by the steps of the workflows). In some embodiments, these definitions are stored in a markup language document (e.g., XML document).

Embodiments can parse the definitions (e.g., using a hybrid script parser) to generate a hybrid script for the enterprise website test. The hybrid script can represent a customized version of an automated test (e.g., customized based on the received definitions). In some embodiments, the hybrid script can then be parsed by an automation tool parser. For example, the hybrid script can be configured to work with any number of automation tools (e.g., web presence test automation tools available to one of ordinary skill in the art). A given automation tool parser can be configured to generate an output that is usable by a specific automation tool. As such, the hybrid script can be combined with different automation tool parsers, and these various combinations can be used to implement the customized test with a variety of different automation tools.

In some embodiments, the output of the automation tool parser can be used to generate a run time script (e.g., to be used by the automation tool associated with the automation tool parser to implement the customized test). For example, the run time script can be received by an automation tool (e.g., cloud based automation tool) that then implements the customized test represented in the run time script on the enterprise website. This implementation generates test results, which can be received and/or displayed in a user interface. For example, the test results can include a status (e.g., Pass, Fail, Skipped) for the workflows defined in the workflow definition and/or for the individual steps of one of these workflows.

The features, structures, or characteristics of the disclosure described throughout this specification may be combined in any suitable manner in one or more embodiments. For example, the usage of "one embodiment," "some embodiments," "certain embodiment," "certain embodiments," or other similar language, throughout this specification refers to the fact that a particular feature, structure, or characteristic described in connection with the embodiment may be included in at least one embodiment of the present disclosure. Thus, appearances of the phrases "one embodiment," "some embodiments," "a certain embodiment," "certain embodiments," or other similar language, throughout this specification do not necessarily all refer to the same group of embodiments, and the described features, structures, or characteristics may be combined in any suitable manner in one or more embodiments.

One having ordinary skill in the art will readily understand that the embodiments as discussed above may be practiced with steps in a different order, and/or with elements in configurations that are different than those which are disclosed. Therefore, although this disclosure considers the outlined embodiments, it would be apparent to those of skill in the art that certain modifications, variations, and alternative constructions would be apparent, while remaining within the spirit and scope of this disclosure. In order to determine the metes and bounds of the disclosure, therefore, reference should be made to the appended claims.

I claim:

1. A method for implementing a customizable enterprise automation test framework, the method comprising:
receiving a workflow definition, a page structure definition, and a function definition for an automated test of an enterprise website, wherein the workflow definition defines one or more workflows for one or more test cases that comprise a series of steps, the page structure definition defines web elements that comprise a plurality of web pages of the enterprise website, and the function definition defines enterprise website specific functions referenced by steps of the one or more workflows;
parsing, by a hybrid script parser, the workflow definition, page structure definition, and function definition to generate a hybrid script for the automated test;
parsing, by an automation tool parser, the hybrid script to generate an output for an automation tool; and
generating, based on the output from the automation tool parser, a runtime script that is executed by the automation tool to generate results for the automated test, wherein the automation tool implements the steps of the one or more workflows on the plurality of web pages of the enterprise web site to generate the results for the automated test.

2. The method of claim 1, further comprising:
receiving, from a user, a selection of one or more of the workflows, wherein the hybrid script parser generates the hybrid script based on the selection of the workflows.

3. The method of claim 2, wherein the workflow definition, page structure definition, and function definition each comprise markup language documents.

4. The method of claim 3, wherein the markup language documents are extensible markup language (XML) documents.

5. The method of claim 2, further comprising:
receiving, from a user, input data that is used by a first of the enterprise website specific functions, wherein, when the automation tool implements the steps of the one or more workflows, implementing at least one of the steps comprises calling the first enterprise website specific function and using the input data to generate results for the automated test.

6. The method of claim 5, wherein the hybrid script generated by the hybrid script parser implements the one step using the first enterprise website specific function and the input data.

7. The method of claim 2, further comprising:
displaying a user interface for the selected workflows that is configured by the workflow definition, wherein a plurality of interface elements are dynamically displayed in the configured user interface based on the steps for the selected workflow.

8. The method of claim 7, wherein a user interface element for the one step displayed on the user interface is configured to receive the input data from the user.

9. The method of claim 8, wherein the user interface is configured based on an asynchronous JavaScript and XML (AJAX) call for the workflow definition.

10. The method of claim 2, wherein the hybrid script is configured to be parsed by a plurality automation tool parsers to generate an output, each automation tool parser is associated with a different automation tool, and runtime scripts that are based on an output from each automation tool parser are configured to be used by different automation tools to generate the results for the automated test.

11. The method of claim 2, wherein the steps of the one or more workflows include default functions that are shared among different enterprise websites and the enterprise website specific functions defined in the function definition that are specific to the enterprise website that is associated with the function definition.

12. The method of claim 2, wherein the hybrid script includes default functions that are shared among different enterprise websites and the enterprise website specific functions defined in the function definition that are specific to the enterprise website that is associated with the function definition.

13. The method of claim 2, further comprising:
receiving edits to the hybrid script from a user through a user interface, wherein
the parsing, by the automation tool parser, comprises parsing the edited hybrid script to generate the output, and
the generating, based on the output from the automation tool parser, of the runtime script comprises generating the runtime script that is executed by the automation tool to generate results for the automated test, the automation tool implementing the steps of the one or more workflows on the plurality of web pages of the enterprise web site based on the edits to the hybrid script to generate the results for the automated test.

14. The method of claim 13, wherein the edited hybrid script results in a customized automated test for the enterprise website.

15. A system for implementing a customizable enterprise automation test framework, the system comprising:
a processor; and
a memory storing instructions for execution by the processor, the instructions configuring the processor to:
receive a workflow definition, a page structure definition, and a function definition for an automated test of an enterprise website, wherein the workflow definition defines one or more workflows for one or more test cases that comprise a series of steps, the page structure definition defines web elements that comprise a plurality of web pages of the enterprise website, and the function definition defines enterprise website specific functions referenced by steps of the one or more workflows;
parse, by a hybrid script parser, the workflow definition, page structure definition, and function definition to generate a hybrid script for the automated test;
parse, by an automation tool parser, the hybrid script to generate an output for an automation tool; and
generate, based on the output from the automation tool parser, a runtime script that is executed by the automation tool to generate results for the automated test, wherein the automation tool implements the steps of the one or more workflows on the plurality of web pages of the enterprise web site to generate the results for the automated test.

16. The system of claim 15, wherein the instructions further configure the processor to:
receive, from a user, a selection of one or more of the workflows, wherein the hybrid script parser generates the hybrid script based on the selection of the workflows.

17. The system of claim 16, wherein the instructions further configure the processor to:

receive, from a user, input data that is used by a first of the enterprise website specific functions, wherein, when the automation tool implements the steps of the one or more workflows, implementing at least one of the steps comprises calling the first enterprise website specific function and using the input data to generate results for the automated test.

18. The system of claim 17, wherein the hybrid script generated by the hybrid script parser implements the one step using the first enterprise website specific function and the input data.

19. The system of claim 16, wherein the instructions further configure the processor to:

display a user interface for the selected workflows that is configured by the workflow definition, wherein a plurality of interface elements are dynamically displayed in the configured user interface based on the steps for the selected workflow.

20. A non-transitory computer readable medium having instructions stored thereon that, when executed by a processor, cause the processor to implement a customizable enterprise automation test framework, wherein, when executed, the instructions cause the processor to:

receive a workflow definition, a page structure definition, and a function definition for an automated test of an enterprise website, wherein the workflow definition defines one or more workflows for one or more test cases that comprise a series of steps, the page structure definition defines web elements that comprise a plurality of web pages of the enterprise website, and the function definition defines enterprise website specific functions referenced by steps of the one or more workflows;

parse, by a hybrid script parser, the workflow definition, page structure definition, and function definition to generate a hybrid script for the automated test;

parse, by an automation tool parser, the hybrid script to generate an output for an automation tool; and generate, based on the output from the automation tool parser, a runtime script that is executed by the automation tool to generate results for the automated test, wherein the automation tool implements the steps of the one or more workflows on the plurality of web pages of the enterprise web site to generate the results for the automated test.

* * * * *